(12) United States Patent
Sczepczenski et al.

(10) Patent No.: US 12,476,797 B2
(45) Date of Patent: Nov. 18, 2025

(54) GENERATING A SECURE KEY EXCHANGE AUTHENTICATION RESPONSE USING A SECURITY PARAMETER INDEX TRANSFORM

(71) Applicant: International Business Machines Corporation, Armonk, NY (US)

(72) Inventors: Richard Mark Sczepczenski, Hyde Park, NY (US); Daniel Hughes, Poughkeepsie, NY (US); Alol Antony Crasta, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 18/459,270

(22) Filed: Aug. 31, 2023

(65) Prior Publication Data

US 2025/0080330 A1  Mar. 6, 2025

(51) Int. Cl.
*H04L 9/08* (2006.01)
*H04L 9/06* (2006.01)

(52) U.S. Cl.
CPC .......... *H04L 9/0825* (2013.01); *H04L 9/0618* (2013.01); *H04L 9/0891* (2013.01)

(58) Field of Classification Search
CPC .... H04L 9/0825; H04L 9/0618; H04L 9/0891
See application file for complete search history.

(56) References Cited

U.S. PATENT DOCUMENTS

| 7,434,045 B1 * | 10/2008 | Enderwick | H04L 63/20 |
| | | | 726/2 |
| 11,038,698 B2 | 6/2021 | Driever et al. | |
| 11,080,336 B2 | 8/2021 | Van Dusen | |
| 11,184,160 B2 | 11/2021 | Zee et al. | |

(Continued)

FOREIGN PATENT DOCUMENTS

| CN | 102447616 B * | 8/2016 |
| WO | 2025/045418 A1 | 3/2025 |

OTHER PUBLICATIONS

"Robert Snively", "Fibre Channel Security Protocols", (Year: 2004).*

(Continued)

*Primary Examiner* — Darshan I Dhruv
(74) *Attorney, Agent, or Firm* — Patterson + Sheridan, LLP

(57) ABSTRACT

Disclosed embodiments provide systems and methods for generating an SKE Authentication Response using a Security Parameter Index (SPI) Transform to provide secure data transfer in a computing environment. A disclosed method comprises receiving, from an initiator channel on an initiator node, a SKE Authentication Request message at a local key manager (LKM) executing a responder node to initiate a secure communication between the initiator channel and a responder channel. The LKM obtains a Security Parameter Index (SPI) Transform, an SA Index, and SPI Transform values. The LKM creates an SPI based on the SPI Transform using the SA Index and the SPI Transform values. The LKM builds an SKE Authentication Response message based on (Continued)

the SKE Authentication Request message and the SPI, which including the SPI and an encryption algorithm. The LKM transmits the SKE Authentication Response message to the initiator channel on the initiator node using the responder channel.

20 Claims, 20 Drawing Sheets

(56) References Cited

U.S. PATENT DOCUMENTS

| | | | |
|---|---|---|---|
| 11,310,036 | B2 | 4/2022 | Sczepczenski et al. |
| 11,405,215 | B2 | 8/2022 | Sczepczenski et al. |
| 11,489,821 | B2 | 11/2022 | Zee et al. |
| 11,502,834 | B2 | 11/2022 | Zee et al. |
| 11,546,137 | B2 | 1/2023 | Sczepczenski et al. |
| 11,563,588 | B2 | 1/2023 | Driever et al. |
| 11,652,616 | B2 | 5/2023 | Zee et al. |
| 2011/0296186 | A1* | 12/2011 | Wong ................ H04L 63/0428 713/171 |
| 2013/0290721 | A1* | 10/2013 | Khalil ................ H04W 12/041 713/171 |
| 2015/0101029 | A1* | 4/2015 | Maino ................ H04L 9/0838 726/4 |
| 2019/0190710 | A1 | 6/2019 | Chopra et al. |
| 2021/0075627 | A1* | 3/2021 | Hathorn ................ H04L 9/3273 |
| 2021/0091943 | A1* | 3/2021 | Hathorn ................ H04L 9/0894 |
| 2021/0266147 | A1* | 8/2021 | Zee ................ H04L 9/3268 |
| 2021/0266177 | A1* | 8/2021 | Sczepczenski ....... H04L 63/205 |
| 2021/0266304 | A1 | 8/2021 | Zee et al. |
| 2021/0273799 | A1 | 9/2021 | Kampati et al. |
| 2021/0273928 | A1 | 9/2021 | Kampati et al. |
| 2022/0021687 | A1 | 1/2022 | Bhattacharya et al. |
| 2022/0263811 | A1* | 8/2022 | Kampati ................ H04L 63/08 |
| 2023/0327871 | A1 | 10/2023 | Ganjikunta et al. |
| 2025/0080330 | A1 | 3/2025 | Sczepczenski et al. |
| 2025/0080343 | A1 | 3/2025 | Sczepczenski et al. |
| 2025/0080348 | A1 | 3/2025 | Sczepczenski et al. |

OTHER PUBLICATIONS

International Searching Authority, International Search Report and Written Opinion for PCT Application No. PCT/EP2024/069059, dated Aug. 19, 2024.
INCITS: "Fibre Channel Generic Services-4 (FC-GS-4) Rev 7.9", Feb. 11, 2004 (Feb. 11, 2004), XP002606595, Retrieved from the Internet <URL:http://www.t10.org/ftp/t11/document.04/04-031v1.pdf> [retrieved on Oct. 25, 2010].
"List of IBM Patents or Patent Applications Treated as Related," for U.S. Appl. No. 18/459,270, filed Aug. 31, 2023.
"Robert Snively", "Fibre Channel Security Protocols", INCITS working draft proposed American National Standard for Information Technology, Jan. 31, 2004, 182 pages.

* cited by examiner

FIG. 9A
Example SPI 32-Bit Field 902
of an SPI Transform Compatibility Mode

| Free | Free | Free |
|---|---|---|
| 1 | 4 bits | SA_INDEX (12 bits) |

Bits 31  30............  7  6...........0
          1              1

Example SPI Transform values 904

SPI_MASK 906
SPI_SHIFT 908
SPI_BASE 910
SA_INDEX 912

Example Min/Max SPI Transform values 914

Min Shift = 8     Max SA Index = 0xFFF
Max Shift = 19    Min SA Index = 1

Example SPI Transform Method 916

Transformation 1: SPI_BASE + SA_INDEX = result 1
Transformation 2: result 1 << SPI_SHIFT = result 2

Generate random number

Transformation 3: random_number & ~SPI_MASK = result 3
Transformation 4: result 2 | result 3 = SPI Example SPI Transform Method 920

Example SPI Transform values 922
SPI_MASK = 0x7FF0F000;
SPI_SHIFT = 0x0C;
SPI_BASE = 0x0002BB9C SA_INDEX = 0x65

Transformation 1: 0x0002BB9C + 0x65 = 0x0002BC01
Transformation 2: 0x0002BC01 << 12 = 0x2BC01000

Generate random number, ex: 0x11223344

Transformation 3: 0x11223344 & ~0x7FF0F000 = 0x00020344
Transformation 4: 0x2BC01000 | 0x00020344 = 0x2BC21344

SPI = 0x2BC21344

FIG. 9B

Example SPI Transform Method 930

Example SPI Transform value limits 932

Min Shift = 8      Max SA Index = 0xFFF
Max Shift = 19    Min SA Index = 1

Example SPI Transform values 934:
   Shift: 19 (Max)
   Mask = 0x7FF80000
   Base = 0
   SA Index = 0xFFF (Max)

Transformation 1: 0x00000000 + 0xFFF = 0x00000FFF
Transformation 2: 0x00000FFF << 19 = 0x7FF80000

Generate random number, ex: 0x11223344

Transformation 3: 0x11223344 & ~0x7FF80000 = 0x00003344
Transformation 4: 0x7FF80000 | 0x00003344 = 0x7FF83344
Transformation 5: 0x7FF83344 | 0x80000080 = 0xFFF833C4

SPI = 0xFFF833C4

FIG. 9C

Example SPI Transform Method 940

Example SPI Transform value limits 942
Min Shift = 8     Max SA Index = 0xFFF   Max Base = 0xF000
Max Shift = 15    Min SA Index = 1      Min Base = 0

Example SPI Transform values 944:
  SPI Shift 15 (Max)
  Mask = 0x7FFF8000
  Base = 0xF000
  SA Index = 0xFFF (Max)

Transformation 1: 0x0000F000 + 0xFFF = 0x0000FFFF
Transformation 2: 0x0000FFFF << 15 = 0x7FFF8000

Generate random number, ex: 0x11223344

Transformation 3: 0x11223344 & ~0x7FFF8000 = 0x00003344
Transformation 4: 0x7FFF8000 | 0x00003344 = 0x7FFFB344
Transformation 5: 0x7FFFB344 | 0x80000080 = 0xFFFFB3C4

SPI = 0xFFFFB3C4

FIG. 9D

GENERATING A SECURE KEY EXCHANGE AUTHENTICATION RESPONSE USING A SECURITY PARAMETER INDEX TRANSFORM

BACKGROUND

The present invention relates to providing security within computing environments, and in particular, to systems and methods for generating a secure key exchange (SKE) Authentication Response using a Security Parameter Index (SPI) Transform to provide secure data transfer in a computing environment.

Encryption provides data security for data and/or other information being transmitted between two entities, such as a source node and a target node coupled via a plurality of endpoints or links. To standardize aspects of encryption, various standards are provided for different types of communication protocols. For instance, the FC-SP-2 and FCLS-3 standards are provided for Fibre channels.

The FC-SP-2 standard, as an example, used for encrypting Fibre Channel links includes protocols for mutual authentication of two endpoints, as well as protocols for negotiating encryption keys that are used in communication sessions between the two endpoints. The standard provides support for a variety of mechanisms to authenticate the involved parties, as well as mechanisms by which key material is provided or developed. The standard is defined for several authentication infrastructures including secret-based, certificate-based, password-based, and pre-shared key based, as examples.

Generally, a certificate-based infrastructure is considered to provide a strong form of secure authentication, as the identity of an endpoint is certified by a trusted certificate authority. The FC-SP-2 standard defines a mechanism by which multiple certified entities can use the public-private key pairs that the certificate binds them to in order to authenticate with each other. This authentication occurs directly between two entities through the use of the Fibre Channel Authentication protocol (FCAP), the design of which is based on authentication that uses certificates and signatures as defined in, for instance, the Internet Key Exchange (IKE) protocol.

SUMMARY

Embodiments of the present disclosure provide to systems and methods for generating a secure key exchange (SKE) Authentication Response using a Security Parameter Index (SPI) Transform to provide secure data transfer in a computing environment.

A disclosed non-limiting computer implemented method comprises receiving, from an initiator channel on an initiator node, a Secure Key Exchange (SKE) Authentication Request message at a local key manager (LKM) executing on a responder node to initiate a secure communication between a responder channel on the responder node and the initiator channel. The LKM obtains a selected Security Parameter Index (SPI) Transform, SPI Transform values, and an SA Index. The LKM creates an SPI based on the SPI Transform using the SA Index and the SPI Transform values. The LKM builds an SKE Authentication Response message based on the SKE Authentication Request message and the SPI; where the SKE Authentication Response message comprises the SPI and a selected encryption algorithm. The LKM transmits the SKE Authentication Response message to the initiator channel on the initiator node using the responder channel.

Another disclosed non-limiting method comprises initializing the LKM on the responder node, and registering security capabilities and security features of channels on the node with the responder LKM, where the responder channels select an SPI Transform mode and provide the SPI Transform values. The LKM registers the selected SPI Transform and the SPI Transform values. The SPI transform values include a random SPI base, a random SPI shift, and a SPI mask, which are used with an SA Index to create the SPI based on the SPI Transform.

Another disclosed non-limiting computer implemented method for generating an SKE SA Initialization Request message comprises the LKM executing on the initiator node receiving a Start LKM message from an initiator channel, where the initiator channel allocates the SA Index and passes the SA Index as a trailer message of the Start LKM message to the LKM. The LKM creates an SA between the initiator node and the responder node based on the Start LKM message. The LKM creates an Authentication key for the initiator node and responder node pair. The LKM obtains a selected Security Parameter Index (SPI) Transform and SPI Transform values, and creates an SPI based on SPI Transform using the SA Index and the SPI Transform values. The LKM builds the SKE SA Initialization Request message based on the Start LKM message and the SPI; where the SKE SA Initialization Request message includes an identifier of the Authentication key, a nonce, and the SPI. The LKM transmits the SKE Authentication Request message to the responder channel on the responder node using the initiator channel.

Another disclosed non-limiting computer implemented method for generating the SKE SA Initialization Response message comprises the LKM executing on the responder node receiving the SKE SA Initialization Request message and an SA Index, and creating an SA between the responder node and the initiator node based on the SKE Initialization Request message. The LKM obtains a selected Security Parameter Index (SPI) Transform, and SPI Transform values, and creates an SPI based on the SPI Transform using the SA Index and the SPI Transform values. The LKM builds the SKE SA Initialization Response message based on the SKE SA Initialization Request message and the SPI, the SKE SA Initialization Response message comprises the SPI, and a set of cryptographic keys, and a list of encryption algorithms. The LKM transmits the SKE SA Initialization Response message to the responder channel, which sends the SKE SA Initialization Response message to the initiator channel on the initiator node.

Other disclosed embodiments include a computer system and computer program product for generating an SKE Authentication Response using an SPI Transform, implementing features of the above-disclosed methods.

BRIEF DESCRIPTION OF THE DRAWINGS

FIGS. 9A, and 9B illustrate an example SPI format of an SPI Transform Compatibility Mode and example operations for implementing an SPI Transform method by an LKM of one or more embodiments of the present disclosure;

FIG. 9C illustrates further example values and example operations of an SPI Transform method by an LKM using zero as an SPI base of one or more embodiments of the present disclosure;

FIG. 9D illustrates further example values and example operations of an SPI Transform method by an LKM using a non-zero value as an SPI base of one or more embodiments of the present disclosure;

DETAILED DESCRIPTION

Figure 1:
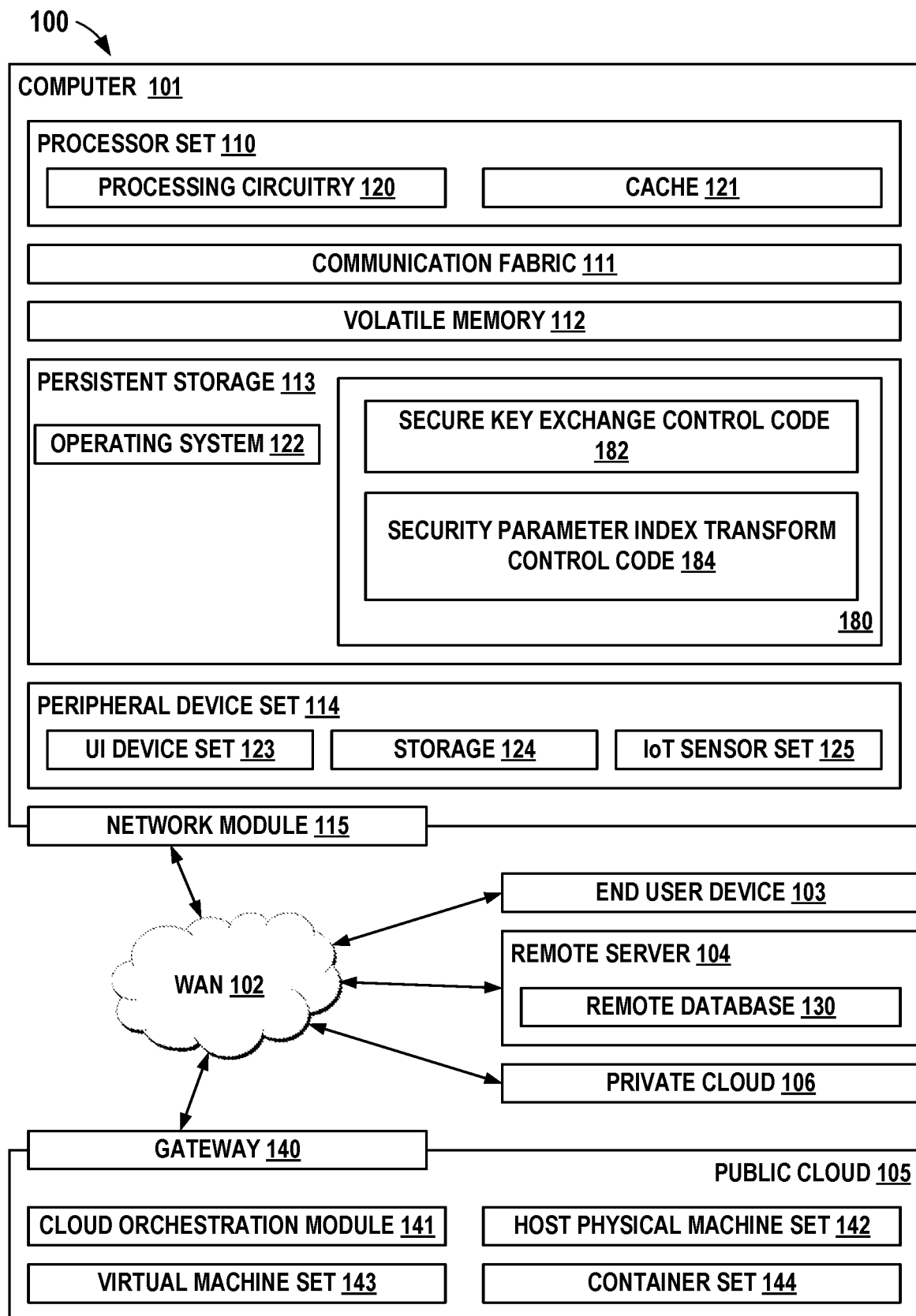
FIG. 1 is a block diagram of an example computer environment for use in conjunction with one or more disclosed embodiments for implementing secure key exchange (SKE) with a Security Parameter Index (SPI) transform to provide secure data transfer.

Existing SKE systems generate a Security Parameter Index (SPI) using a random number generator with no association with other values. The SPI provides an identification tag included in a clear (unencrypted) text portion of an encrypted Fibre Channel (FC) data frame. A receiver of a FC data frame uses the SPI field to validate the key material used to encrypt the data payload. Embodiments of the present disclosure provide new techniques enabling effective and efficient secure data transfer that use SKE messaging with an SPI Transform, which enables additional functions for a given Security Association (SA) between two endpoints in a computing environment, such as enabling a hardware acceleration function, overcoming some limitations of conventional secure data transfer arrangements.

Embodiments of the present disclosure provide systems and methods for implementing SKE messaging using an SPI Transform to provide secure data transfer between two endpoints, or nodes, in a network or computing environment. In disclosed embodiments, secure data transfers are implemented between computing nodes (e.g., a host server and a storage array) using SKE messaging, which uses an SPI Transform of disclosed embodiments. SKE messaging methods implement SKE SA Initialization Request and SKE SA Initialization Response messages using a selected SPI Transform of disclosed embodiments. SKE messaging methods implement SKE Authentication Request and SKE Authentication Response messages using an SPI Transform of disclosed embodiments. In disclosed embodiments, the SKE SA Initialization Request and Response Messages exchange parameters used to derive a set of cryptographic keys and can be exchanged in an unencrypted format. In disclosed embodiments, SKE Authentication Request and Response messages establish the authenticity of each endpoint, or node, and identify which encryption algorithm to be used to secure the communication between the endpoints and can be sent in an encrypted format. Disclosed embodiments implement Rekeying a Security Association using an SPI Transform to provide secure data transfer.

Generating an SKE Authentication Request Message Using an SPI Transform

Disclosed embodiments generate an SKE Authentication Request message using an SPI Transform to provide security for data transfers between channels in a computing environment. An LKM executing on an initiator node receives an SKE SA Initialization Response message from an initiator channel or host bus adapter (HBA) requesting the initialization of the secure communication with another channel, or a responder channel on a responder node. In a disclosed embodiment, the LKM performs state and verification checks of the received SKE SA Initialization Response message, and for example invokes an error handler responsive to unexpected state, message sequence, or the like, and can perform a recovery process. In a disclosed embodiment, when determined that the state is correct and expected values are verified, the LKM obtains a saved SA Index and SPI Transform values, previously provided by the channel, and computes or transforms an SPI for the initiator channel for a SPI Transform Compatibility mode using the SPI Transform values and the SA Index. In a disclosed embodiment, the LKM derives a set of cryptographic keys based on an SA payload of the SKE SA Initialization Response message, and builds a proposal list of encryption algorithms based on one or more security capabilities supported by the initiator node. The LKM generates a SKE Authentication Request message, which can include the set of cryptographic keys, an initiator signature, and the proposal list of encryption algorithms. In a disclosed embodiment, the LKM sends the SKE Authentication Request message with an encrypted payload to the Initiator channel, which transmits the SKE Authentication Request message with a trailer SA Index message to the Responder channel of the responder node.

Generating an SKE Authentication Response Message Using an SPI Transform

Disclosed embodiments generate an SKE Authentication Response message using an SPI Transform to provide security for data transfers between channels in a computing environment. An LKM executing on the responder node receives the SKE Authentication Request message from the Responder channel. The Responder channel receives the SKE SA Initialization Request message from the Initiator channel on an initiator node. In a disclosed embodiment, the LKM performs state and verification checks of the received SKE Authentication Request message, decrypts the message and performs validation checks, for example to validate the initiator signature. In a disclosed embodiment, when determined that the initiator signature and validation checks are correct, the LKM can compute a responder signature, for example based on an initiator nonce, a shared key, a responder identifier, and at least one key from a set of cryptographic keys. In a disclosed embodiment, the LKM selects an encryption algorithm from the proposal list, and obtains the SA Index and SPI Transform values. In a disclosed embodiment, the LKM computes or transforms the SPI based on an SPI Transform using the SPI Transform values and the SA Index, with the transformed SPI to be placed in the SPI field of the SKE Authentication Response Message. In a disclosed embodiment, the LKM builds the SKE Authentication Response message, and a payload of the SKE Authentication Response message can include the responder signature and an indicator of the selected encryption algorithm. In a disclosed embodiment, the LKM can encrypt the payload of the SKE Authentication Response message using the same encryption algorithm as used for encrypting the payload of the SKE Authentication Request message. In a disclosed embodiment, the LKM builds and sends a Done Message with the SKE Authentication Response message. In a disclosed embodiment, the Done message can include one or multiple session keys, an initiator SPI, and a responder SPI, where the session keys can support encryption and decryption of data transfers to enable encrypted communication between the initiator channel and responder channel using the selected encryption algorithm. In a disclosed embodiment, the LKM start a session key rekey timer, which is used to trigger a rekey process.

Disclosed Rekeying Keys of a Security Association Using an SPI Transform

Disclosed embodiments implement rekeying an authentication key and a session key for a Security Association, using the disclosed SPI transform of an SPI Transform Compatibility mode. In accordance with disclosed embodiments, the rekey timers are initiated and monitored using the LKMs at each of the nodes. In a disclosed embodiment, a rekey event can trigger rekeying of either an authentication key or a session key. In a disclosed embodiment, an authentication key rekey timer is used to limit an amount of time an authentication key remains valid. In a disclosed embodiment, a session key rekey timer is used to limit an amount of time, or a number of transfers, that the session key remains valid for the current communication session between two channels. Authentication keys are used across many SAs between two nodes, such as a host server and a storage array, and Authentication keys are implemented, via the EKM, between the trusted nodes that share multiple links is performed once, rather than on a link-by-link basis. Session keys are maintained for a single SA for a communication session between two channels. The session keys can support encryption and decryption of data transfers between the initiator channel and responder channel in combination with knowledge of the selected encryption algorithm by both the initiator node and the responder node. In a disclosed embodiment, a respective LKM creates session keys, using the SPI transform of the SPI Transform Compatibility mode, providing authentication of the links, without having to re-authenticate the trusted nodes via the EKM. In disclosed embodiments, the LKM controls (e.g., initiates and monitors) a separate session key rekey timer associated with a pair of channels for each of the communication sessions that are in process between channels on the node where the LKM is executing and channels on a second node in the computing environment (e.g., between channels of a source node and a target node).

As used herein the term secure key exchange or SKE refers to a protocol used to create a security association between two endpoints, or nodes, (e.g., host server node and storage array node) in a computing environment or network. A Security Parameter Index (SPI) is an identifier used in SKE messages to identify an established SA between two nodes. The SKE protocol described herein builds upon the Internet Key Exchange (IKE) protocol and implements SKE messaging using an SPI Transform of disclosed embodiments. For FICON channel to channel (CTC) connections, each of the ports, or channels, can be both initiators and responders. In contrast to FICON channels, in one embodiment, Fibre Channel protocol (FCP) storage channels on a host are always the source, or initiator; and the control unit, or storage array, is always the target, or responder. In a disclosed embodiment, FCES is used to encrypt data in flight using the Fibre Channel and FICON protocols. Fibre Channel Endpoint Security (FCES), offered by International Business Machines Corporation, Armonk, N.Y. provides data encryption in flight using the Fibre Channel (FC) and Fibre Connection (FICON) protocols. FCES helps to ensure the integrity and confidentiality of all data flowing on Fibre Channel links between authorized hosts and storage devices, by creating a trusted storage network that encrypts data in flight. In FCES, security levels are negotiated and established between the host and storage devices using secure key exchange (SKE) messaging. SKE messaging builds upon the Internet Key Exchange (IKE) protocol of a disclosed embodiment. A Security Parameter Index (SPI) is an identifier used in SKE messages to identify an established Security Association (SA) between two endpoints.

In disclosed embodiments, a local key manager (LKM) executing on a node is configured to implement SKE messaging using an SPI Transform to provide secure data transfer between the node and another node in a computing environment or system. In disclosed embodiments, the LKM executing on each node (e.g., host server node and storage array node) can connect to an external key manager, which is used to create shared secret messages to which only the parties involved have access. In disclosed embodiments, the LKM acts as a client of the external key manager, issuing key management interoperability protocol (KMIP) requests to create Authentication, or shared, keys. The LKM receiving a newly created Authentication key, updates a local data set or key store with the Authentication key, removes the expired key, and starts an Authentication key rekey timer for the newly created Authentication key. In disclosed embodiments, the LKM executing on an initiator (e.g., source) node implements SKE messaging using the SPI Transform to create session keys for each SA between an initiator (e.g., source) channel on an initiator node and a responder (e.g., target) channel on a responder node, and start session key rekey timers. In accordance with disclosed embodiments, Authentication keys (i.e., shared keys) rekey timers and session key rekey timers are set based on system policies, and are used to rekey or refresh the Authentication and session keys.

Disclosed embodiments provide a HBA, or channel, security registration with an LKM for SKE message processing to allow secure data to be sent between computing nodes in a computing environment. In a disclosed embodiment, the LKM, which manages multiple security keys for the HBAs on a computing node, is initialized on the computing node. The LKM establishes a connection with an external key manager (EKM) remote from the computing node to obtain an Authentication key or shared key for multiple SAs. In addition, the HBAs, or channels, on the computing node executing the LKM are registered with the LKM. The registration of the HBAs with the LKM allows HBAs to properly process SKE messages sent to or received from the computing node. In a disclosed embodiment, the HB As register security features with the LKM, which can include the respective HBAs selecting use of a SPI Transform mode. In a disclosed embodiment, the HBAs can select a supported SPI Transform mode comprising one of a SPI Transform Compatible mode or a SPI Transform Pass Through mode. In a disclosed embodiment, the HBAs provide SPI transform values that are registered by the LKM; and the SPI transform values may include, for example one or more of a random SPI base, a random SPI shift, or a SPI mask (e.g., shifted by the random SPI shift) and may be used as part of an initialization configuration message. In a disclosed embodiment, the SPI transform values may be updated when selected by the HBAs, and can be maintained until the channel is reset or configured offline. Once LKM initialization is complete, the LKM is aware of the security capabilities, the selected SPI Transform mode, and the SPI transform values of the HBAs (e.g., channels). The LKM uses this information to build and manage the security of data requests between the computing node and other computing nodes in the computing environment.

Disclosed embodiments implement a selected SPI Transform by an LKM, where the SPI Transform comprises one of a SPI Transform Compatible mode or a Pass Through SPI Transform mode. Authentication of the identities exchanging data and encryption of the data enabled with SKE messaging uses the SPI Transform of disclosed embodiments. In disclosed embodiments, an allocated SA Index is sent to the LKM executing on an initiator node by an initiator channel on the initiator node. With the SPI Transform Compatible mode, the SPI is transformed based on an SA Index and SPI transform values, which for example, include a random SPI base, a random SPI shift, or a SPI mask (e.g., shifted by the random SPI shift). In disclosed embodiments, the SPI may be computed using multiple predefined transformations including predefined combinations of the SA Index, a generated random number, and SPI transform values.

Disclosed embodiments implement generation of an SKE SA Initialization Request message, using an SPI Transform to provide security for data transfers between channels in a computing environment. The other channel can be located on the same node to provide the ability to securely pass data between two different partitions executing on the same node; or the other channel can also be located on a different computing node. The SKE SA Initialization Request processing is performed after the LKM initialization and registration of the HBAs to a LKM on the computing node that is generating the SKE SA Initialization Request message. In a disclosed embodiment, the LKM executing on an initiator node receives a Start LKM message, which is sent to the LKM from an initiator channel or HBA requesting the initialization of the secure communication with another channel, or a responder channel on a responder node. In a disclosed embodiment, the LKM generates the SKE SA Initialization Request in response to receiving the Start LKM message. In a disclosed embodiment, the LKM receives a SA Index (used with a selected SPI Transform mode) from an initiator channel with the received Start LKM message of disclosed embodiments. The LKM creates a SA between the initiator node and the responder node based on the Start LKM message and obtains an authentication key (i.e., shared key) for the initiator node and responder node pair. In a disclosed embodiment, the LKM computes or transforms an SPI in an identified SPI Transform Compatibility mode using SPI transform values and the SA Index. For example, LKM calculates the SPI using random number generated SPI transform values with the SA Index; for example, the SPI transform values can include selected ones of a random SPI base, a random SPI shift, or a SPI mask, with the SA Index. In a disclosed embodiment, the transformed SPI which is sent in clear (e.g., unencrypted) text provides additional security for the SA Index transfer with SKE SA messaging. The LKM creates the SKE SA Initialization Request message based on a derived set of cryptographic keys, a proposal list of encryption algorithms and an initiator signature. The LKM sends the SKE SA Initialization Request message to the Initiator channel, which transmits the SKE SA Initialization Request message to the Responder channel of the Responder node.

Disclosed embodiments implement generation of an SKE SA Initialization Response message, using an SPI Transform to provide security for data transfers between channels in a computing environment. An LKM executing on the Responder node receives the SKE SA Initialization Request message and the Security Association Index from the Responder channel in response to the Initiator channel on an Initiator node sending the SKE SA Initialization Request message to the Responder channel. In a disclosed embodiment, the LKM creates a SA for the initiator node and responder node pair, uses an existing Authentication key or creates a new Authentication key, computes or transforms an SPI for the responder channel (e.g., for an identified SPI Transform Compatibility mode using SPI Transform values and an SA Index). In a disclosed embodiment, the LKM generates a nonce for the responder channel, and derives keys to be used for encryption and decryption. The LKM generates the SKE SA Initialization Response message including an identifier of the Authentication key, the nonce, and the SPI for the responder channel. The LKM sends the SKE SA Initialization Response message to the responder channel, which sends the message to the Initiator channel on the initiator node.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 illustrates a computing environment 100 contains an example of an environment for the execution of at least some of the computer code involved in performing the inventive methods, such as Secure Key Exchange Control Code 182 and Security Parameter Index Transform Control Code 184, at block 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
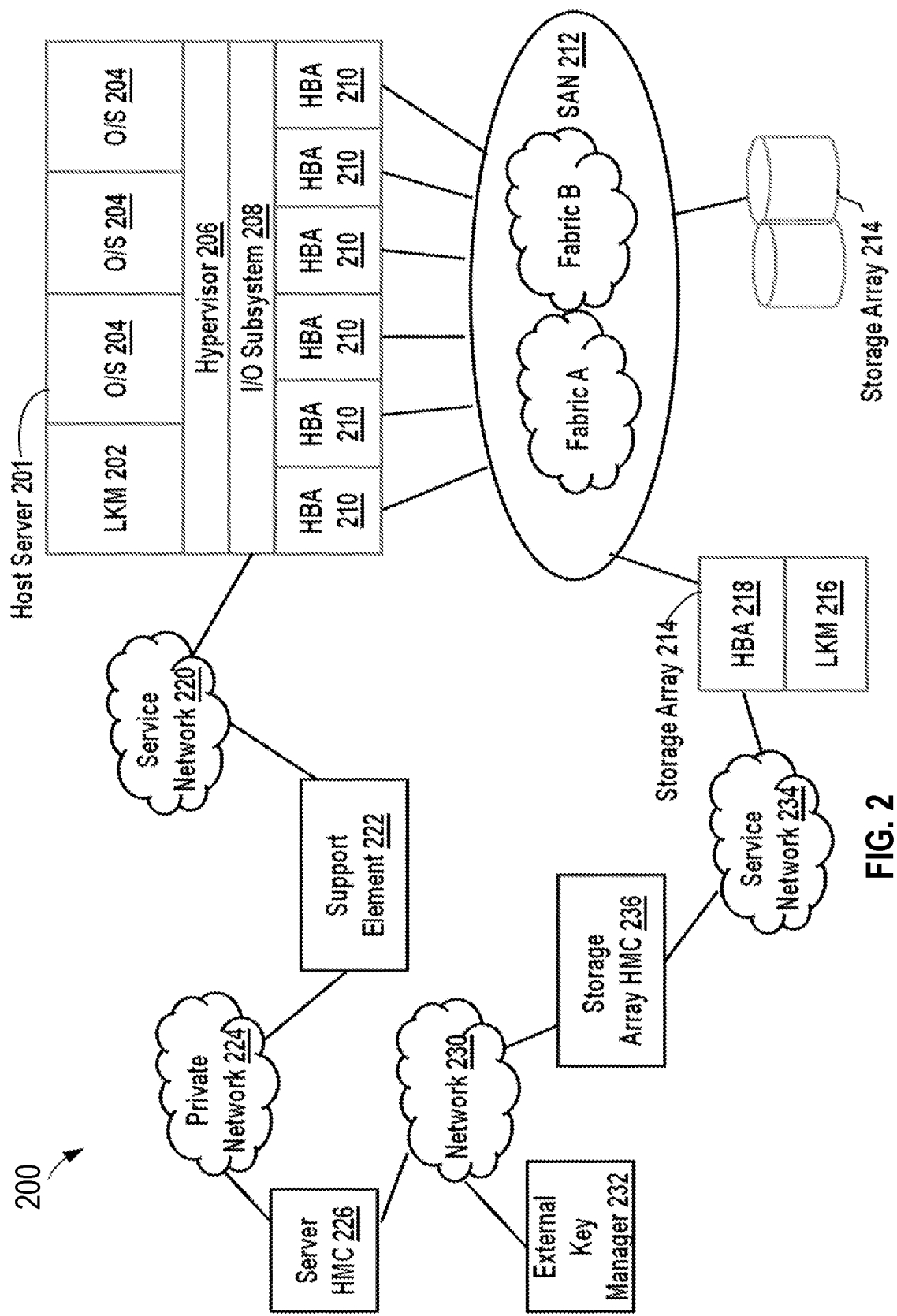
FIG. 2 is a block diagram of an example system for implementing SKE messaging with an SPI transform to provide secure data transfer of one or more embodiments of the present disclosure.

FIG. 2 illustrates an example computing environment or system 200 for implementing SKE messaging with the SPI transform of one or more disclosed embodiments. System 200 provides secure data transfer using SKE with a selected supported SPI Transform, such as a SPI Transform Compatibility mode or a SPI Transform Pass Through mode in accordance with disclosed embodiments. System 200 can be used in conjunction with the computer 101 and the SKE Control Code 182 and SPI Transform Control Code 184 of FIG. 1 for implementing inventive methods of the present disclosure.

System 200 includes multiple nodes comprising at least one node host 201 (e.g., host server 201) and at least one storage array 214 coupled together via a storage area network (SAN) 212. Host server 201 can include a central processing unit and memory and may be implemented by a computer, a server, a central electronics complex (CEC), or a computer system, such as an IBM Z System Server offered by International Business Machines Corporation. The storage array 214 can be implemented, for example, by a storage device, a direct access storage device (DASD), a tape device, or the like. The SAN 212 can be implemented by a network of FICON and Fibre Channel switches and directors. FICON established a communication path for data between the host and the storage device utilizing FC technology.

Host server 201 includes an local key manager or LKM 202 for managing private keys (e.g., authentication keys and session keys), and one or more Operating Systems (OSs) 204 (e.g., three OSs 204 as shown). Host server 201 includes a hypervisor 206 for managing logical partitions and providing an interface between the partitions and an Input/Output (I/O) subsystem 208. The I/O subsystem 208 provides an interface to the one or more HBAs 210 (e.g., six HBAs 210 as shown). In accordance with a disclosed embodiment, the LKM 202 manages private keys for the HBAs 210, and each of the HBAs 210 provides an input/output (I/O) interface that transmits and encrypts data via the SAN 212 to one or more storage arrays 214. Storage array 214 includes an LKM 216 and one or more HBAs 218, with one HBA shown with one storage array in FIG. 2. The HBAs 210 and the HBAs 218 communicate via the SAN 212

System 200 includes a service network 220 coupling one or more support elements (SEs) 222 to one or multiple hosts 201. The SEs 222 are also coupled via a private network 224 to a server hardware management console (HMC) 226. As shown, the service network 220 is an internal server network that is used by the SEs 222 to communicate with each subsystem, or host 201 and can be implemented, for example, by an Ethernet network or other known local area network (LAN). As shown, the private network 224 is used for SE 222 to communication with the server HMC 226 and can be implemented, for example, by an Ethernet network or other known LAN. Each server HMC 226 manages multiple hosts 201 and can communicate with the SEs 222 over the private network 224 using an SE certificate. Each SE 222 manages hardware that communicates to the LKM 202 in host 201 via the service network 220. For example, the SE 222 can be implemented by a server. In a disclosed embodiment, each SE 222 corresponds to one host server 201 and includes instructions to initialize the corresponding host server 201 using an SE certificate. Having the SEs 222 communicate with the host servers 201 via an internal service network 220 provides an additional level of protection to the SE certificate. As shown, a network 230 couples the server HMC 226 to an external key manager (EKM) 232. A service network 234 couples the storage array 214 to a storage array HMC 236, which can be implemented, for example, by an Ethernet network or other known local area network (LAN). Each storage array HMC 236 can be used to manage multiple storage arrays 214 and can communicate with the storage arrays 214 via service network 234. The storage array HMC 236 is coupled by network 230 to the EKM 232. The EKM 232 is used to provide authentication keys to the host 201 and the storage array 214. The EKM 232 is trusted by the host server 201 and the storage array 214 for example, via certificates installed on the host server 201, the storage array 214, and the EKM 232 at set-up, and signed by a certification authority (not shown). During SKE messaging, SKE request and response messages are generated and processed to ensure that the correct level of security is used by the end points (i.e., the host server 201 and the storage array 214).

In the illustrative methods of FIGS. 3, 4A, 4B, 5A, 5B, 6I, 6B, 7A, 7B, 8A, 8B, 9A-9D, and FIGS. 10, 11, and 12 of disclosed embodiments, the same reference numbers are used to provide example operations of components of system 200 of FIG. 2. Various example operations and functions of the illustrative methods implemented with control components, hardware logic, and software logic, for example can be provided by system 200 in conjunction with, the Secure Key Exchange Control Code 182 and Security Parameter Index Transform Control Code 184 of disclosed embodiments of FIG. 1.

Figure 3:
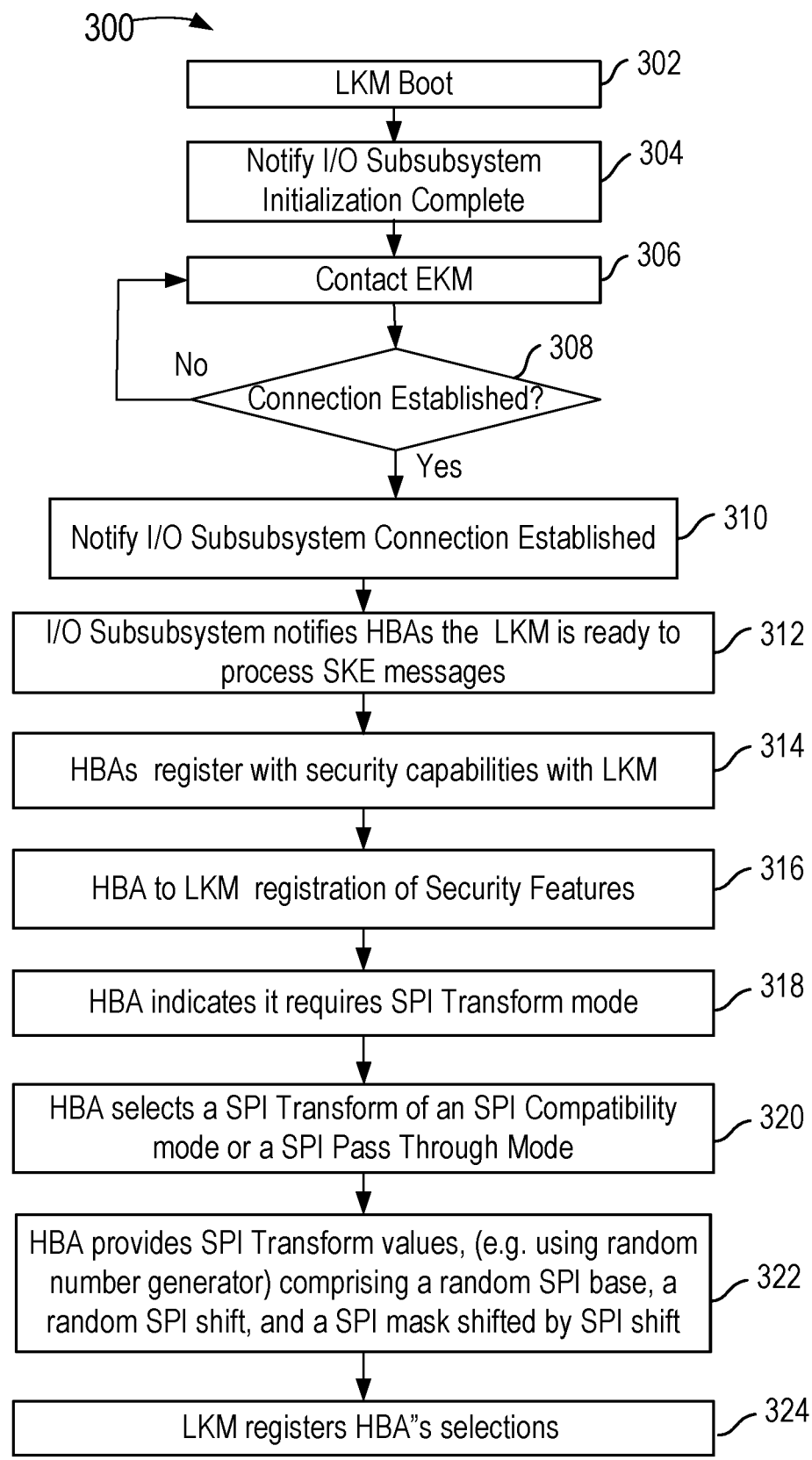
FIG. 3 is a flow chart of example operations of a method for implementing local key manager (LKM) initialization and host bus adapter (HBA), or channel, security registration enabling SKE messaging to initiate a secure communication using an SPI transform of one or more embodiments of the present disclosure.

FIG. 3 illustrates example operations of a method 300 (e.g., implemented with LKM 202 and HBAs 210 of system 200 of FIG. 2, together with the Secure Key Exchange Control Code 182 and Security Parameter Index Transform Control Code 184 of FIG. 1) for implementing LKM initialization and host HBA security registration for using the SPI Transform of one or more embodiments of the present disclosure. At block 302, an LKM is activated on a node, such as LKM 202 of host server 201 of FIG. 2, at LKM boot. At block 304, the LKM 202 notifies the I/O subsystem 208 via the hypervisor 206 that the initialization of the LKM 202 is complete. For example, the initialization of the LKM 202 is complete when the LKM 202 begins executing on the host server 201.

At block 306, the LKM 202 initiates contact with the EKM 232 to request a secure connection, for example using a KMIP message containing the request and a transport layer security (TLS) session across network 230 to the EKM. At decision block 308, checking whether a connection can be established with the EKM 232 is performed; for example, based on a message returned from the EKM in response to the request sent by the LKM 202 at block 306. At block 310, when the LKM 202 establishes a secure connection between the LKM 202 and the EKM 232, the LKM notifies the I/O subsystem 208. At block 312, the I/O subsystem 208 notifies the HBAs 210 that the LKM 202 is ready to process SKE messages. At block 314, the HBAs 106 register their security capabilities with the LKM.

As indicated at block 316, processing continues with the HBA to LKM registration of security features. At block 318, the HBA 210 notifies the LKM 202 that a selected SPI Transform mode is required. At block 320, the HBA 210 selects a supported SPI Transform of an SPI Transform Pass Through mode or a SPI Transform Compatibility mode. In one disclosed embodiment, during initialization when a selected SPI Transform mode is not selected by the HBA 210, a SPI is a generated random number without association with any other values. At block 322, the HBA provides SPI Transform values to be used for the SPI Transform Compatibility mode. In a disclosed embodiment, the HBA using a random number generator to provides the SPI Transform values. As shown, the SPI transform values comprise a random SPI base, a random SPI shift, and a SPI mask shifted by the SPI shift. As indicated at block 324, the LKM registers the HBA's selections. The LKM includes a database, or data store, for example of defined fields, to store the HBA's selections of the SPI Transform mode and the SPI transform seed values, keys, SA Indices, and the like.

Figure 4A:
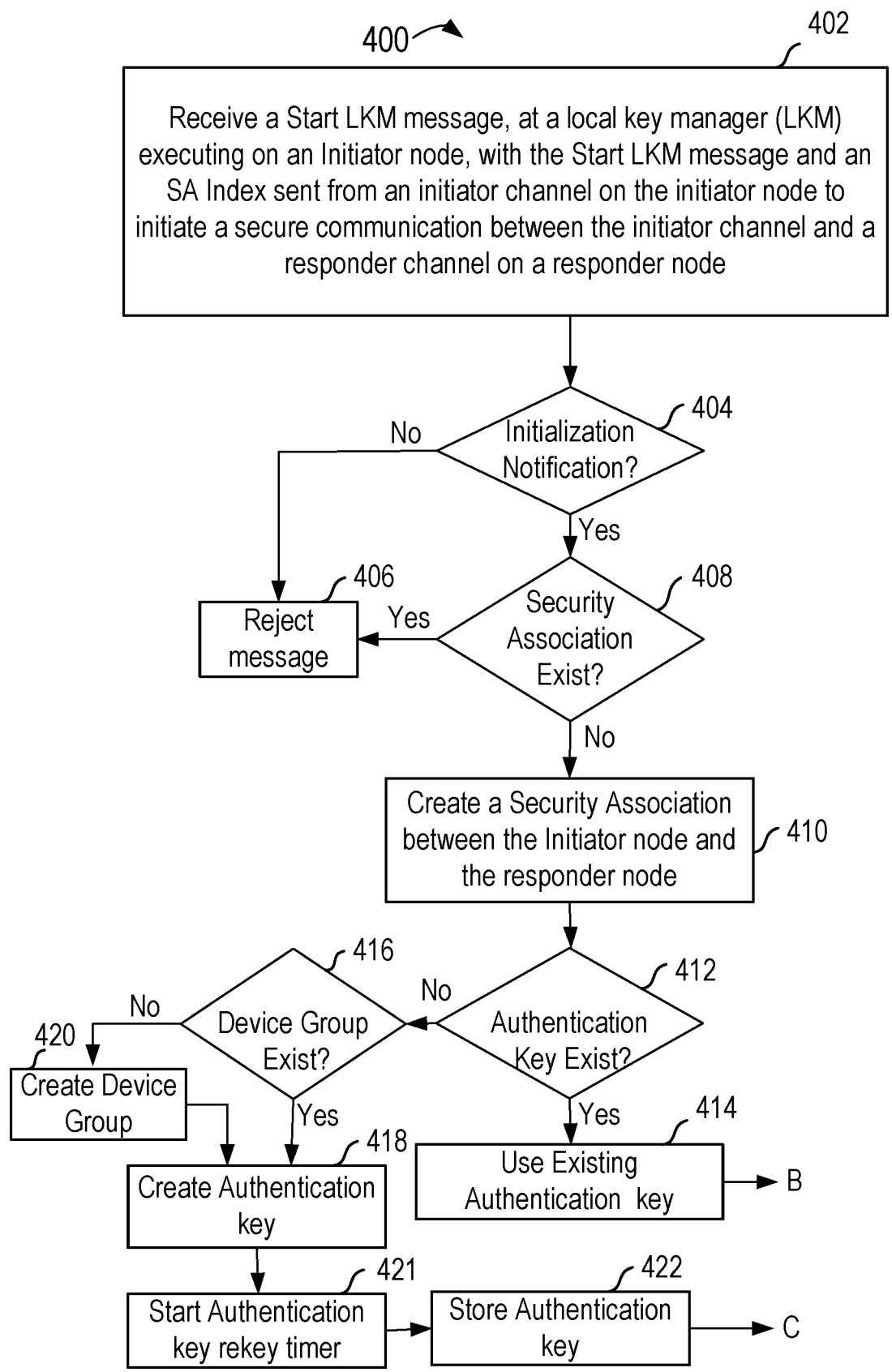
FIGS. 4A and 4B together provide a flow chart of example operations of a method for generating an SKE SA Initialization Request message using an SPI transform of one or more embodiments of the present disclosure.
Figure 4B:
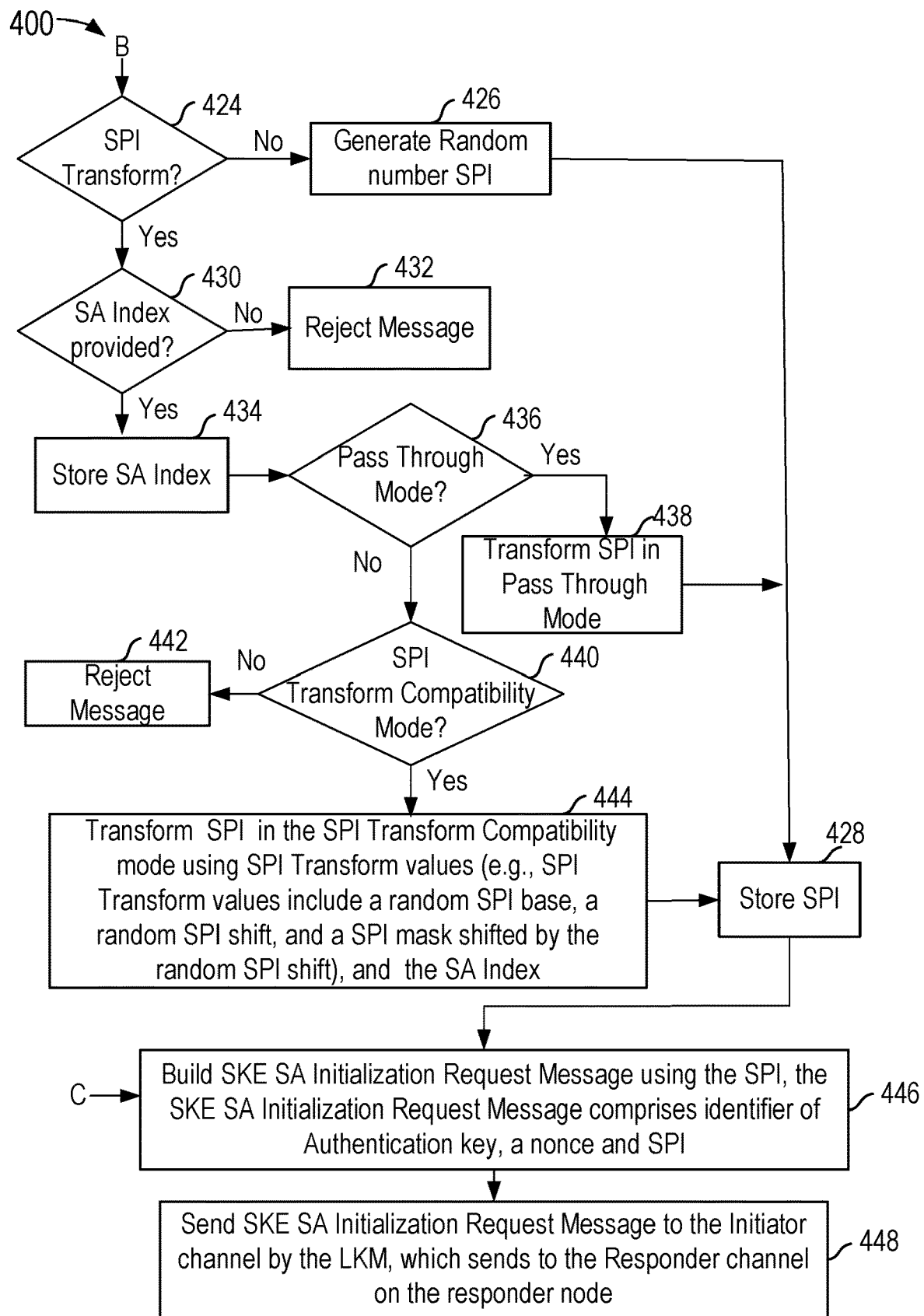

FIGS. 4A and 4B together illustrate example operations of a method 400 (e.g., implemented by system 200 of FIG. 2 and the Secure Key Exchange Control Code 182 and Security Parameter Index Transform Control Code 184 of FIG. 1) for generating an SKE SA Initialization Request message using the SPI Transform of one or more embodiments of the present disclosure. As indicated at block 402 in FIG. 4A, an SKE process begins with receiving a Start LKM message, at a local key manager (LKM) executing on an initiator node, with the Start LKM message and an SA Index sent from an initiator channel on the initiator node, to initiate a secure communication between the initiator channel and a responder channel on a responder node. The initiator channel starts the SKE process with no input from the responder channel. The SA Index is processed with the SPI Transform values based on the SPI Transform algorithm to create the SPI for the SPI Transform Compatibility mode of disclosed embodiments. In a disclosed embodiment, the initiator channel (e.g., HBA 210) sends the SKE Start LKM message and the SA Index to the LKM 202 requesting the initialization of a secure communication between the initiator channel (e.g., HBA 210) and the responder channel (e.g., HBA 218).

At decision block 404, LKM checks whether the initiator channel or initiator HBA 210 has registered with the LKM 202. When determined that the initiator HBA 210 has not registered with the LKM 202, the received message is rejected at block 406. When determined that the initiator HBA 210 has registered with the LKM 202, at decision block 408 the LKM checks whether an SA exists between the HBA 210 on the initiator node (i.e., host server 201) and the HBA on the responder node (i.e., storage array 214), (e.g., based on the received Start LKM message). When the LKM 202 identifies an SA, the received message is rejected at block 406. Otherwise, as indicated at block 410 the LKM creates a SA between the initiator node and the responder node (e.g., SA between the initiator node and responder node pair).

At decision block 412, LKM 202 checks whether an authentication key, (e.g., shared key), exists for the initiator node and responder node pair. When determined that an authentication key for the initiator node and responder node pair exists, processing continues with using the existing authentication key at block 414 and LKM 202 continues processing at block 424 following entry point B in FIG. 4B.

At decision block 416, when determined at decision block 412 that an authentication key does not exist for the initiator node and responder node pair, LKM 202 checks whether a device group exists for the initiator node and responder node pair, (e.g., LKM queries the EKM whether a device group exists for the initiator node and responder node pair, and EKM responds with an identifier for the device group when available). At block 418, when determined that a device group exists, LKM 202 creates an authentication key for the initiator node and responder node pair. Otherwise, when a device group does not exist; at block 420, LKM 202 communicates with the EKM 232 and creates a device group. After the device group is created, LKM creates the authentication key at block 418.

In a disclosed embodiment, at block 421 after the LKM 202 creates the authentication key for the initiator node and responder node pair, LKM starts an authentication key rekey timer for the authentication key. At block 422, LKM 202 stores the authentication key for the initiator node and responder node pair, which is used for building an SKE SA Initialization Request message at block 446 following entry point C in FIG. 4B.

Referring to FIG. 4B following entry point B, at decision block 424, LKM 202 checks whether a SPI Transform is registered for the initiator node and responder node pair. When determined a SPI Transform was not selected, the SPI is generated (e.g., generated by HBA 210) using a random number generator at block 426. The random number generated SPI is stored at block 428. When determined that the SPI Transform is registered, LKM 202 checks whether a SA Index is provided at decision block 430. When a SA Index is not provided, the received message is rejected at block 432. Otherwise, LKM stores the SA Index at block 434. At decision block 436, LKM checks whether the SPI Transform mode is a selected SPI Transform Pass Through Mode. At block 438, when the SPI Transform Pass Through Mode is selected, the SPI is computed in the Pass Through Mode (e.g., the SPI provided by the channel can be used without change) and the Pass Through SPI is stored at block 428. At decision block 440, LKM checks if a SPI Transform Compatibility Mode is selected, when the SPI Transform Pass Through Mode is not selected. When determined that the SPI Transform Compatibility Mode is not selected, the received message is rejected at block 442.

At block 444, when the SPI Transform Compatibility Mode is selected, the SPI is transformed (e.g., computed or calculated) in the SPI Transform Compatibility Mode using the stored SPI Transform values with the SA Index. The random number SPI transform values comprise for example, the random SPI base, the random SPI shift, and the SPI mask shifted by the random SPI shift, generated during initialization of the LKM 202 and registration of the HBAs 210 with the LKM 202 at block 322 in FIG. 3.

Referring also to FIGS. 9A, 9B, 9C, and 9D, example operations (e.g., example transformations and operations performed by LKM at block 444) are shown for implementing an example SPI of an SPI Transform Compatibility Mode of disclosed embodiments. FIG. 9A provides an example illustrative SPI format 902 that can be used for an SPI Transform Compatibility Mode to transform, or create, an SPI of disclosed embodiments. As shown, the SPI format 902 comprises, for example, 32 bits with multiple fields including variable shifted 12-bit SA Index field and defined free fields used with example SPI Transform values 904 comprising SPI mask 906, SPI shift 908, SPI base 910 and the SA Index 912. Example SPI Transform minimum and maximum values 914 are shown for SPI shift 908 and SA Index 912 of a disclosed embodiment. An example SPI Transform method or SPI Transform algorithm 916 of a disclosed embodiment, provided for illustrative purposes, includes Transformations 1-4, (e.g., SPI Transform includes two or more Transformations) including the SA Index 912, the SPI Transform values 904 and a generated random number, as shown. In a disclosed embodiment, the Transformations 1-4 include multiple different combinations of the SPI mask 906, SPI shift 908, SPI base 910, SA Index 912, the generated random number, and transformation results 1, 2, and 3. FIG. 9B provides example operations of Transformations 1-4 of an SPI Transform method 920 with example SPI Transform values 922 of the SPI mask 906, SPI shift 908, SPI base 910, and an example value of the SA Index 912, and includes examples of the Transformations 1-4 of SPI Transform algorithm 916 as shown in FIG. 9A. FIG. 9C illustrates further example operations of another SPI Transform method 930 for implementing an SPI of an SPI Transform Compatibility Mode of a disclosed embodiment using a zero value as an SPI Base. SPI Transform method 930 includes example SPI Transform minimum/maximum limits 932 and example SPI Transform values 934 for SPI shift 908, SPI mask 906, and a zero SPI base 910 together with an example value of the SA Index 912, and further example Transformations 1-5 for implementing an SPI of an SPI Transform Compatibility Mode of a disclosed embodiment. FIG. 9D illustrates further example operations of another SPI Transform method 940 for implementing an SPI of an SPI Transform Compatibility Mode of a disclosed embodiment using a non-zero value as an example SPI Base. SPI Transform method 940 includes example SPI Transform minimum/maximum limits 942 and example SPI Transform values 944 for the SPI shift 908, SA Index 912 and SPI base 910 together with an example value of the SA Index 912, and further example Transformations 1-5 for implementing an SPI of an SPI Transform Compatibility Mode of a disclosed embodiment.

Returning to FIG. 4B, at block 446, LKM builds an SKE SA Initialization Request message using the given SPI stored at block 428 and the stored authentication key at block 422 in FIG. 4A. The SKE SA Initialization Request message includes the SPI, an authentication key identifier, and a nonce. At block 448, the SKE SA Initialization Request message is sent from the LKM 202 to the initiator channel (e.g., HBA 210), which sends the SKE SA Initialization Request message in clear text to the responder channel (e.g., HBA 218) on the responder node (e.g., storage array 214).

Figure 5A:
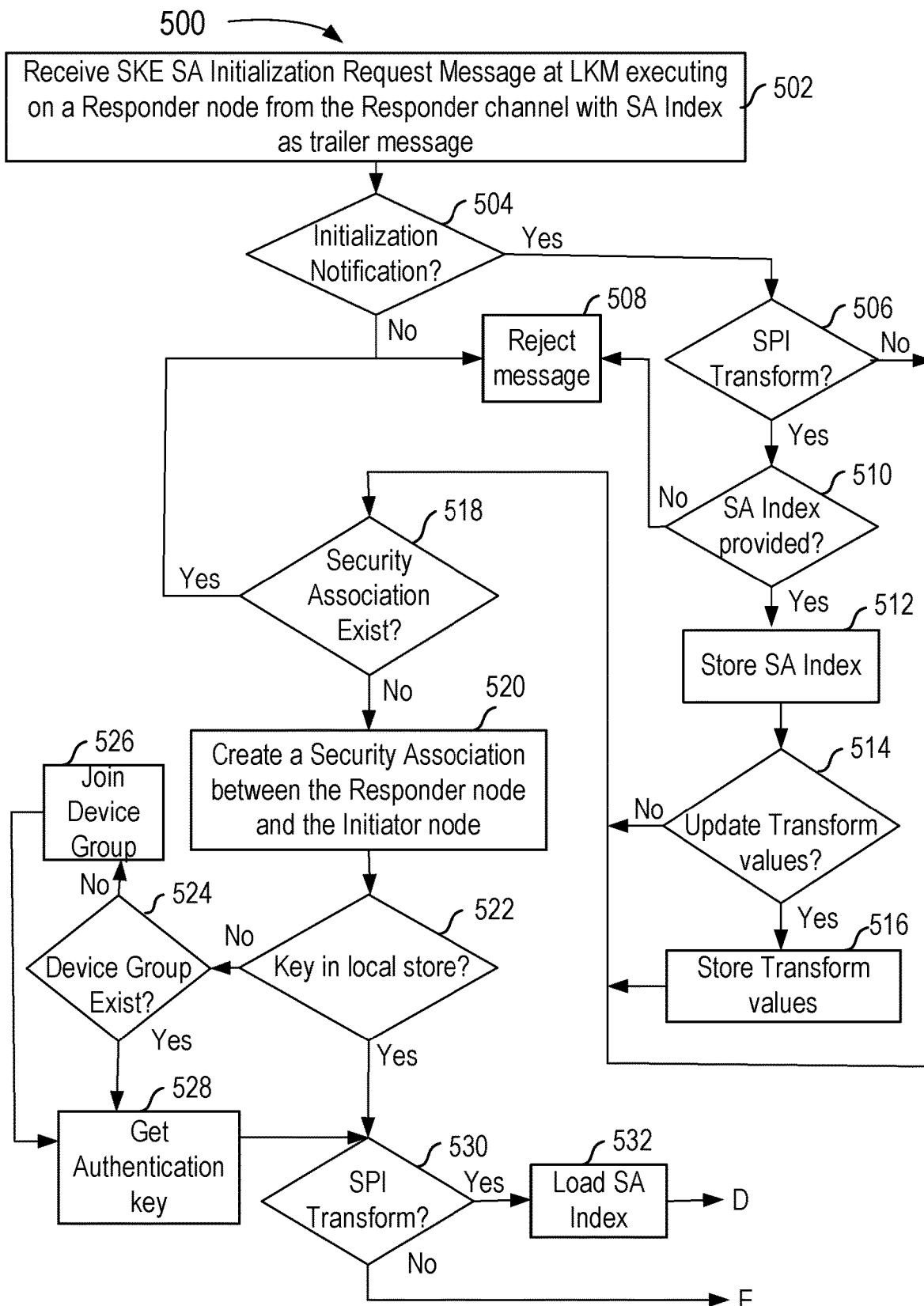
FIGS. 5A and 5B together provide a flow chart of example operations of a method for generating an SKE SA Initialization Response message using an SPI transform of one or more embodiments of the present disclosure.
Figure 5B:
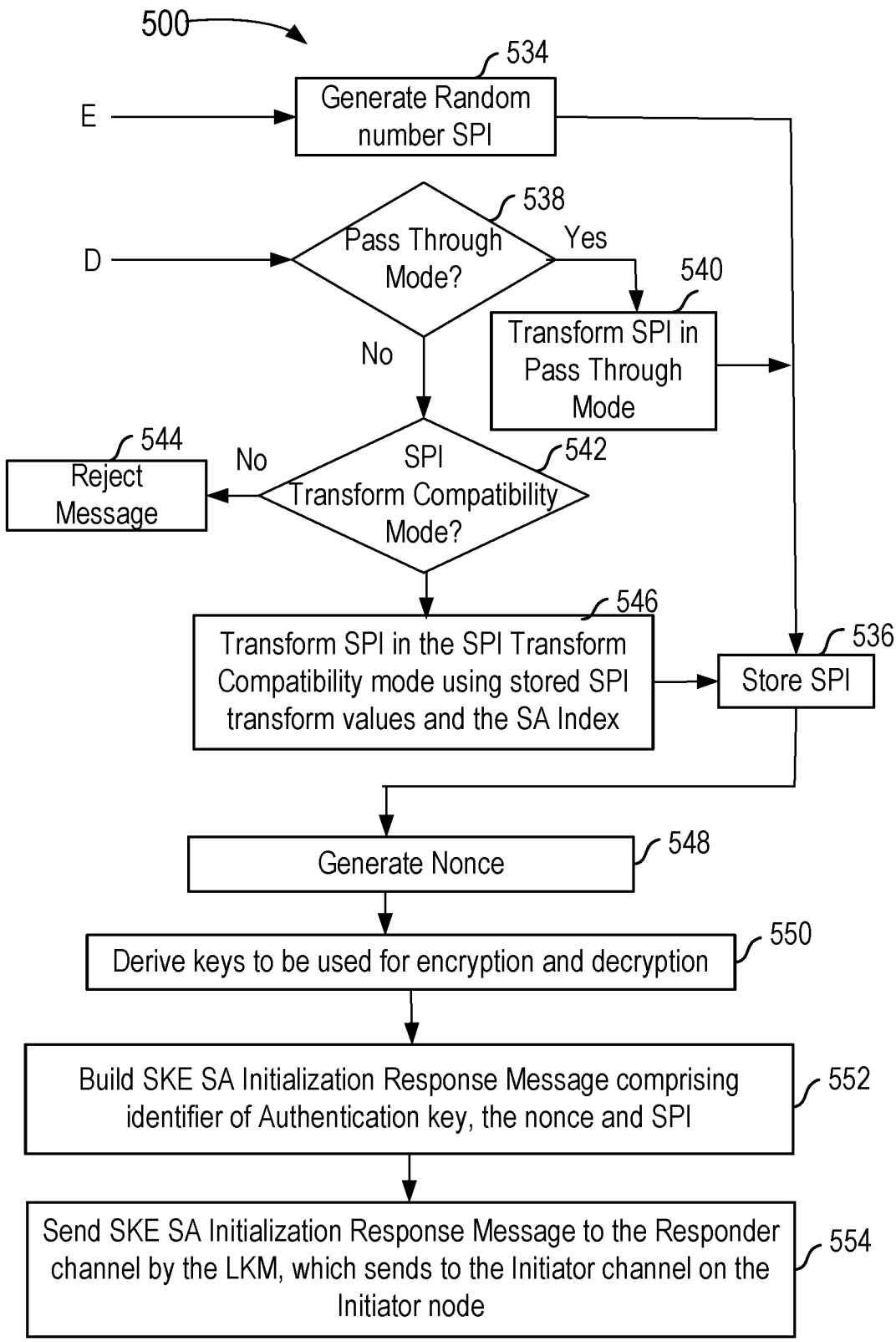

SKE message processing continues to FIGS. 5A and 5B after generating the SKE SA Initialization Request message in FIGS. 4A and 4B, where LMK generates a SKE SA Initialization Response message. FIGS. 5A and 5B illustrates example operations of a method 500 (e.g., implemented by the LKM 216 and responder channel 218 of system 200 of FIG. 2 and the Secure Key Exchange Control Code 182 and Security Parameter Index Transform Control Code 184) for generating the SKE SA Initialization Response message using the SPI transform of a disclosed embodiment. At block 502, the LKM 216 executing on a responder node, such as the storage array node 214, receives the SKE SA Initialization Request message from the responder channel or HBA 218, which was sent from an initiator channel or HBA 210 of the host server node 201. In a disclosed embodiment, the responder channel or HBA 218 allocates an SA Index, which is performed in response to receiving the SKE SA Initialization Request message, and passes the SA Index as an SA Index trailer message. At decision block 504, LKM 216 checks an initialization notification to determine whether the responder channel or responder HBA has registered with the LKM 215 on the responder node. When determined that the responder HBA has not registered with the LKM, the received message is rejected at block 508. At decision block 510, when determined that the responder HBA has registered with the LKM, the LKM checks whether a SPI Transform has been selected.

After determining that a SPI Transform has been selected, at decision block 510 the LKM checks whether a SA Index has been provided. When determined a SA Index has not been provided, the received message is rejected at block 508. The LKM can perform recovery process, for example to identify and correct a temporary error condition, such as when the message is out of sequence, or delete the rejected message. At block 512 when a SA Index has been provided, LKM stores the SA Index. At decision block 514, LKM checks whether to update the SPI transform values. For example, the HBA or channel can select to provide updated or new SPI transform values during the SPI message processing. When determined to update the SPI transform values, LKM receives and stores the updated SPI transform values at block 516.

When determined at decision block 506 that a SPI Transform has not been selected, and after storing the SA Index and obtaining the SPI Transform values, processing continues to decision block 518, where the LKM checks whether a SA exists between the HBA on the initiator node and the HBA on the responder node, (e.g., based on the received SKE SA Initialization Request message). When the LKM identifies an SA, the received message is rejected at block 508. When the LKM does not identify an SA, the LKM creates an SA between the initiator node and responder node pair at block 520 by communicating with the EKM 232 as described before. At decision block 522, after creating the SA, the LKM checks if an Authentication, or shared, key exists for the initiator node and responder node pair (e.g. LKM checks in its local store). If an Authentication shared key does not exist, at block 522 LKM checks if a device group exists. At block 526, LKM joins a device group when a device group does not exist and then obtains an Authentication key at block 528. At decision block 530, after an Authentication key is obtained, checking to determine if an SPI Transform is selected. At block 532, when determined that the SPI Transform is selected, LKM loads the SA Index, and operations continue at block 538 following entry point D in FIG. 5B. When determined that the SPI Transform is not selected, operations continue at block 534 following entry point E in FIG. 5B.

In FIG. 5B, at block 534, a random number generator generates the SPI. In one embodiment, the generated random number has no association with other values, and the generated random number SPI is stored at block 536. At decision block 538, LKM checks to determine whether the SPI Transform Pass Through Mode was selected. At block 540, when the SPI Transform Pass Through Mode is identified, the SPI is provided for the Pass Through Mode and the Pass Through SPI is stored at block 536. For example, in a disclosed embodiment, a received SPI can be stored without change for the Pass Through SPI at block 536. At decision block 542, when the SPI Transform Pass Through Mode is not selected, LKM checks to determine whether a SPI Transform Compatibility Mode was selected. When determined that the SPI Transform Compatibility Mode was not selected, the received message is rejected at block 544.

At block 546, otherwise, when the SPI Transform Compatibility Mode was selected, the SPI is created for the responder channel (e.g., as described with respect block 444 to FIG. 4B and the illustrated examples of FIGS. 9A, 9B, 9C, 9D) based on the SPI Transform using the stored SPI Transform values and the SA Index. The calculated SPI is stored at block 536. At block 548, a nonce is generated for the responder channel. At block 550, keys to be used in the encryption and decryption between the initiator channel and the responder channel are derived at the responder node. The keys can be generated using the nonce and SPI of the responder, the nonce and SPI of the initiator, and the Authentication key. Key derivation, for example can be based on pseudo random function (PRF) parameters negotiated in a SA payload of an SKE SA Initialization message exchange established between the initiator and responder. For example, "PRF+" can be a basic operator for generating keys for use in authentication and encryption mode. Salts can be generated as part of key material, e.g., a salt is random data that can be used as an additional input to a one-way function that hashes data, a password or passphrase. At block 552, LKM 516 builds the SKE SA Initialization Response message using the SPI to provide the SKE SA Initialization Response message, which can include an identifier of the Authentication key, the nonce and the SPI of disclosed embodiments.

Generating an SKE Authentication Request Message Using an SPI Transform

Figure 6A:
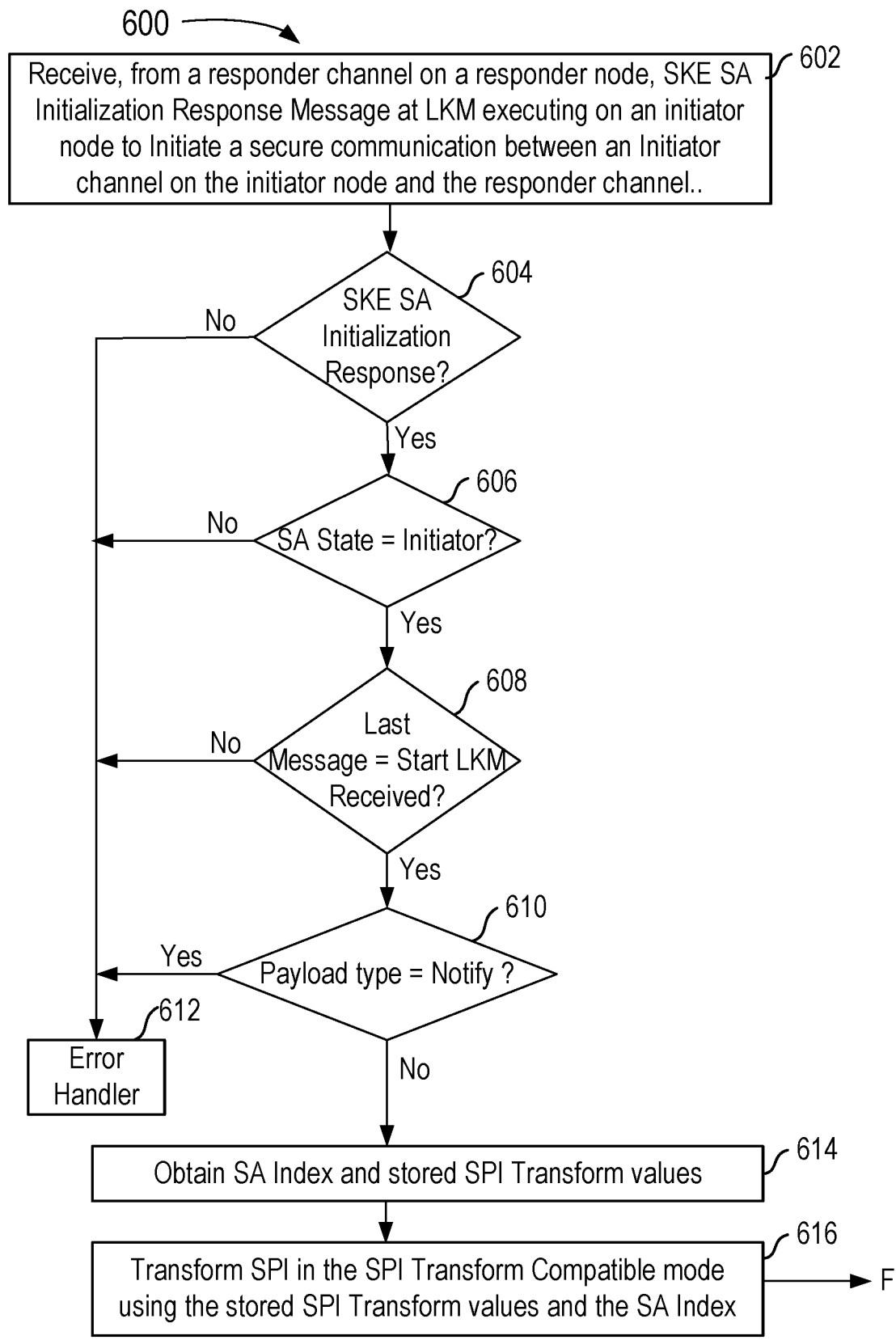
FIGS. 6A and 6B together provide a flow chart of example operations of a method for generating an SKE Authentication Request using an SPI Transform of one or more embodiments of the present disclosure.
Figure 6B:
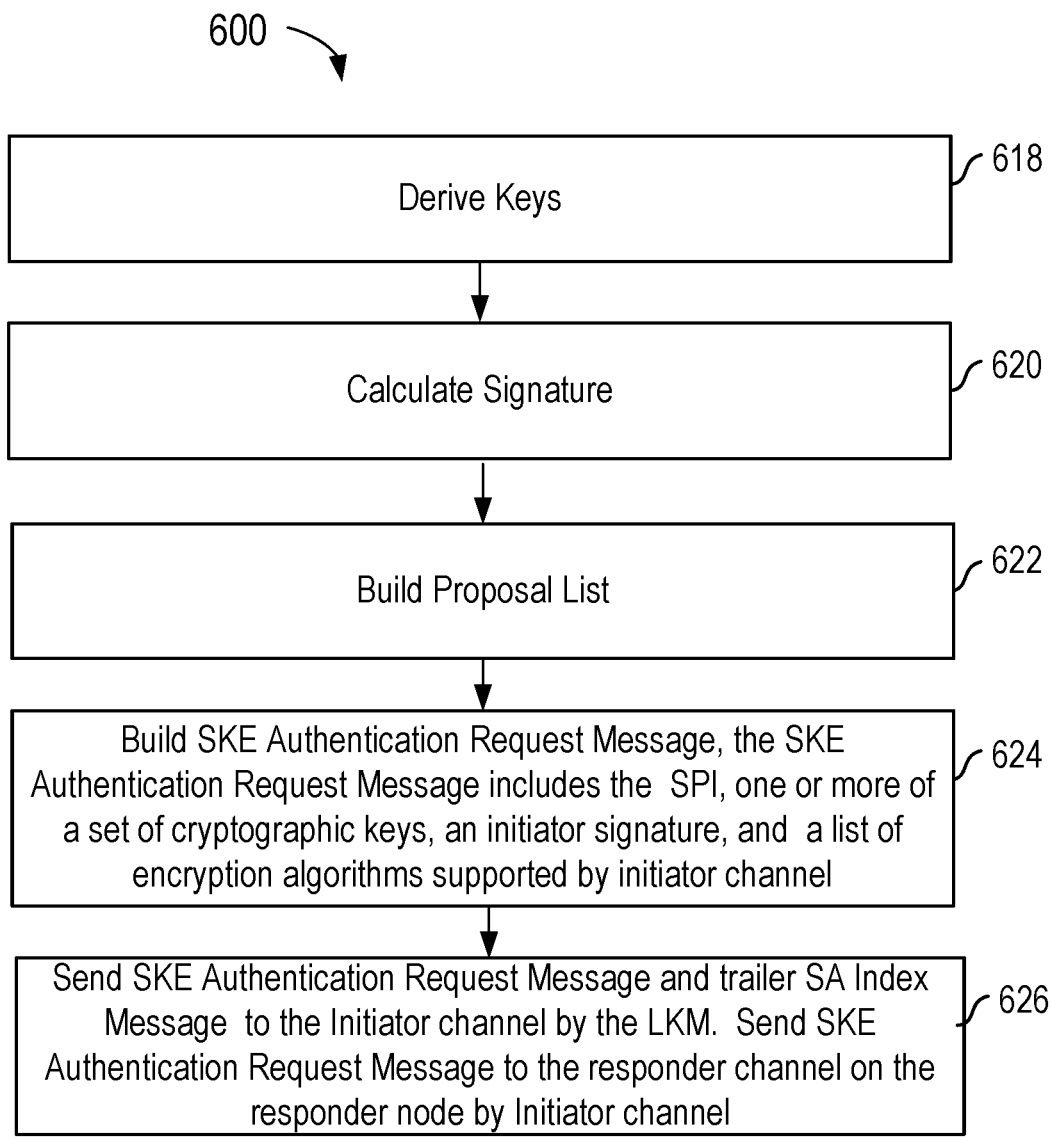

SKE message processing continues to FIGS. 6A and 6B, after generating the SKE SA Initialization Response message in FIGS. 5A and 5B, where LMK generates an SKE Authentication Request Message of disclosed embodiments. FIGS. 6A and 6B illustrates example operations of a method 600 (e.g., implemented by LKM 202 and Initiator channel 210 of system 200 of FIG. 2 and the Secure Key Exchange Control Code 182 and Security Parameter Index Transform Control Code 184 of FIG. 1) for generating the SKE Authentication Request Message using the SPI Transform of disclosed embodiments.

At block 602, the LKM 202 executing on the initiator node receives the SKE SA Initialization Response message from a responder channel 218 on a responder node to initiate a secure communication between an initiator channel 210 on the initiator node and the responder channel 218. At decision block 604, LKM checks if the received message is an SKE SA Initialization Response message. When SKE SA Initialization Response message is the received message, at decision block 606, LKM checks the SA state to determine whether the channel is an initiator.

At decision block 608, when determined the SA state is an initiator, LKM performs a message sequencing check to verify that the last message received at an SA state machine associated with the Initiator node and Responder node pair was a Start LKM message; for example, the Start LKM message provides the SA Index. At decision block 610, LKM checks for a Payload type of Notify in response to Start LKM message detected as the last message received. When determined the received message is not an SKE SA Initialization Response message, the SA state is not an initiator, the Start LKM message was not the last message received, or the Payload type of Notify is identified, the Error Handler is called at block 612. The Error Handler may reject the received message and support a retry sequence as part of a conventional recovery process of SKE messaging in case the error condition was a temporary condition.

When determined the Payload type of Notify is not identified, the SA Index and the stored SPI Transform values are obtained at block 614. At block 616, LKM transforms, or creates an SPI using the stored SPI Transform values and the SA Index, (e.g., as described with respect method 400 to FIG. 4B) and the transformed or created SPI is placed in the SKE Authentication Request to be generated. Processing continues at block 618 following entry point F in FIG. 6B.

In FIG. 6B, at block 618, LKM can derive a set of cryptographic keys based on an SA payload of the SKE SA Initialization Response message. Key derivation can be based on PRF parameters negotiated in a SA payload of the SKE SA Initialization Response message as described before with respect to method 500 of FIGS. 5A and 5B. At block 620, LKM can calculate an Initiator Signature based at least in part on one or more parameters extracted from the SKE SA Initialization Response message. For example, the initiator signature can be based on a responder nonce, a shared key, an initiator identifier, and at least one key from the set of cryptographic keys extracted from the SKE SA Initialization Response message. At block 622, LKM can build a proposal list of encryption algorithms based on security capabilities reported by the HBA that are supported by the Initiator channel. For example, the capabilities can include a list of encryption algorithms supported by the initiator node which may change over time to ensure that different encryption algorithms are selected over a period of time to further enhance security. At block 624, LKM builds the SKE Authentication Request Message based at least in part on the derived set of cryptographic keys and the proposal list of encryption algorithms, where one or more of the cryptographic keys are used to compute the initiator signature that is included with the proposal list in the SKE Authentication Request message of a disclosed embodiment. The LKM of the initiator node can encrypt the payload of the SKE Authentication Request message using a determined encryption algorithm. The SKE Authentication Request message includes the SPI calculated at block 616 in FIG. 6A, and at least one of a set of cryptographic keys, an initiator signature, and a list of encryption algorithms. At block 626, the LKM sends the SKE Authentication Request message with encrypted payload to the Initiator channel, which transmits the SKE Authentication Request message to the Responder channel of the Responder node, which sends the SKE Authentication Request message to the LKM on the responder node.

Generating an SKE Authentication Response Message Using an SPI Transform

Figure 7A:
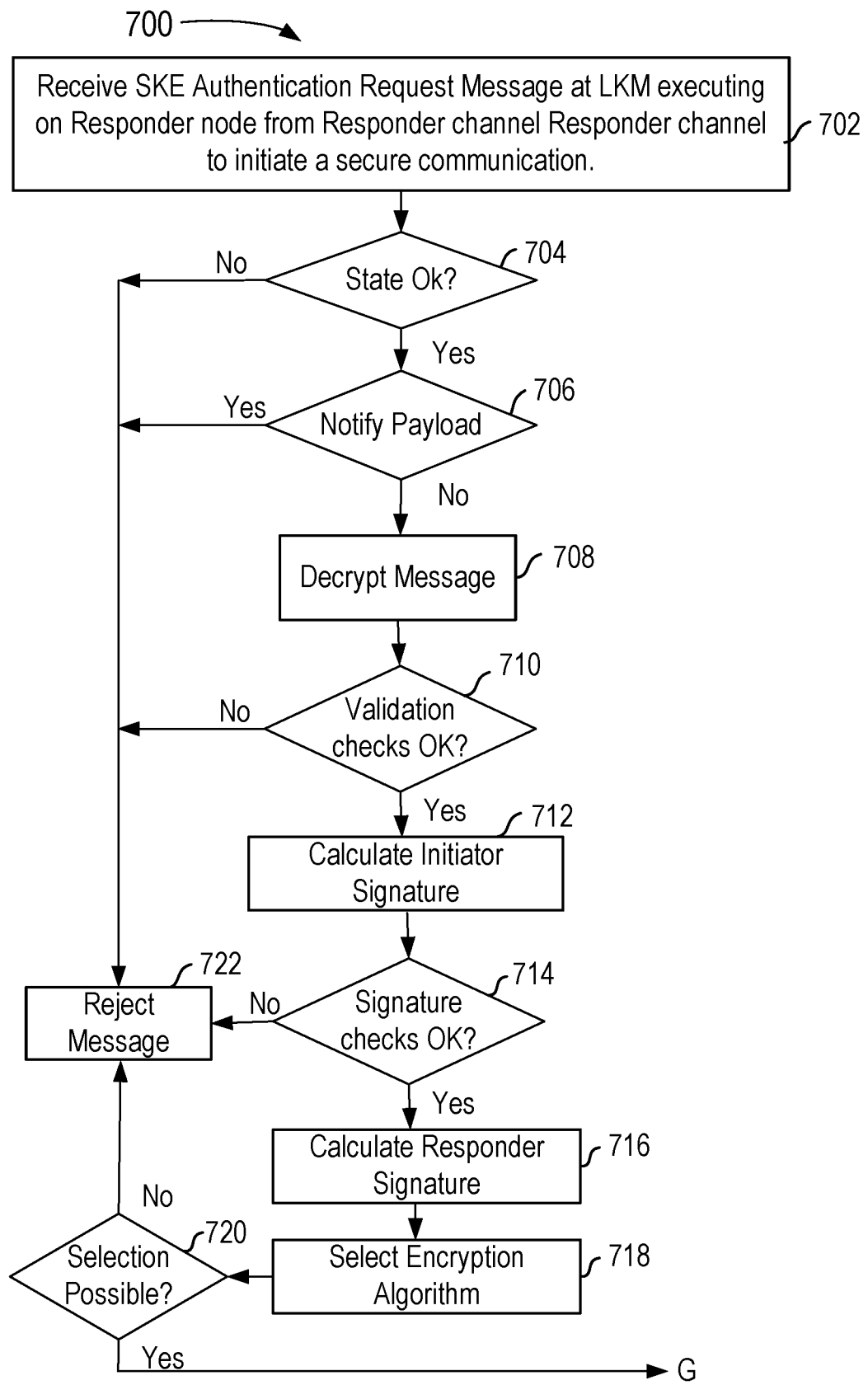
FIGS. 7A and 7B together provide a flow chart of example operations of a method for generating an SKE Authentication Response using an SPI Transform of one or more embodiments of the present disclosure.
Figure 7B:
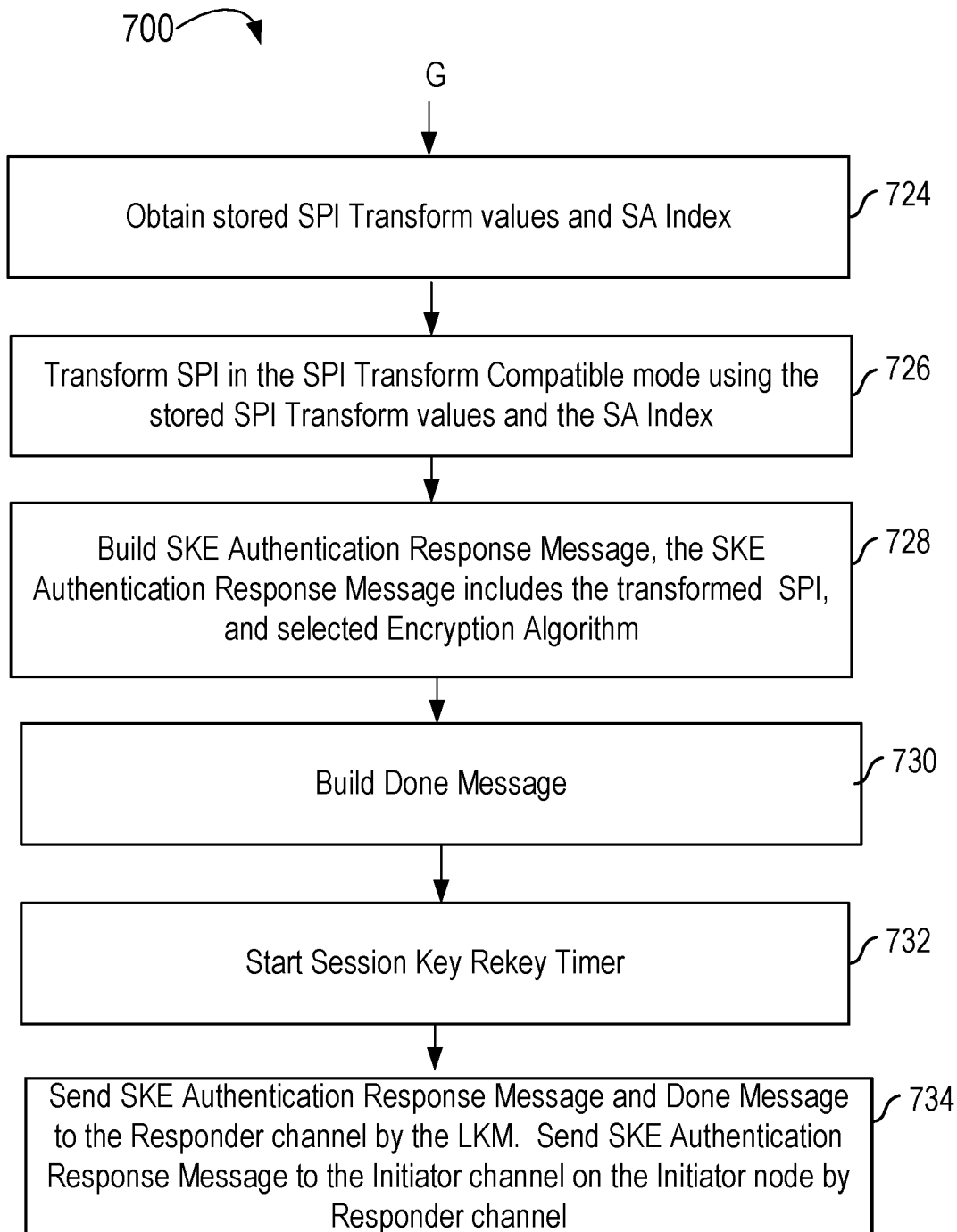

SKE message processing continues to FIGS. 7A and 7B after generating the SKE Authentication Request message in FIGS. 5A and 5B, where LMK generates an SKE Authentication Response Message of disclosed embodiments. FIGS. 7A and 7B illustrates example operations of a method 700 (e.g., implemented by the LKM 216 and responder channel 218 of system 200 of FIG. 2 and the Secure Key Exchange Control Code 182 and Security Parameter Index Transform Control Code 184 of FIG. 1) for generating an SKE Authentication Response Message using the SPI Transform of one or more embodiments of the present disclosure. At block 702, the LKM 216 executing on the Responder node receives the SKE Authentication Request message from the Responder channel 218. The Responder channel 218 receives the SKE SA Initialization Request message from Initiator channel 210 on an Initiator node. In a disclosed embodiment, the Responder channel sends an SKE SA Index message combined with the SKE SA Initialization Request message as a trailer message providing the SA Index to the LKM 216. At decision block 704, LKM 216 checks to determine if the State is correct (e.g., verify selected values are correct). For example, the state check can include confirming that the SA exists for Initiator node and responder node pair with a shared key, and an SA mode check can confirm that the mode of the SA is set to Responder. The state check at block 704 may also include verifying that a last received message state and a last sent message state of the LKM 216 match expected values. For example, a message sequence state machine can be checked to confirm that the last message sent from the responder node was an SKE SA Initialization Response message and the last message received was an SKE Authentication Request message.

At decision block 706, when determined the State is correct (e.g. all expected values are verified), LKM 216 checks to determine if the payload type of the SKE Authentication Request message is a Notify payload type. A Notify message type can indicate a fault or other condition at the initiator node that prevents further progress in the authentication sequence. For example, the LKM of the initiator node, such as LKM 202, may have a communication error, a key access error, a sequencing error, or other such condition. The Notify payload type indicator can appear unencrypted within the payload of the SKE Authentication Request message. At block 708, the message payload of the SKE Authentication Request message is decrypted. After decryption, LMK can perform further validation checks at decision block 710. Validation checks of the SKE Authentication Request message can include, for example, checking one or more message header parameters and an identifier of the payload based on decrypting the payload. Parameters that can be checked in the message header may include a version and a payload length. The decrypted payload of the SKE Authentication Request message can be checked to confirm that a world-wide node name or world-wide port name identified in the message matches an expected value based on the SKE SA Initialization Request message.

At block 712, LKM 216 can calculate an initiator signature, and the initiator signature can be checked at decision block 714. For example, the initiator signature can be computed at LKM 216 based on a responder nonce, a shared key, an initiator identifier, and at least one key from the set of cryptographic keys extracted from a previous message, such as the SKE SA Initialization Request message. The computed initiator signature can be compared to the initiator signature received in the SKE Authentication Request message, where the initiator signature may be extracted from the payload of the SKE Authentication Request message after decryption as a further validation. If the initiator signature check passes at block 714, a responder signature can be computed at block 716. The responder signature can be computed based on an initiator nonce, a shared key, a responder identifier, and at least one key from a set of cryptographic keys, for example values extracted from a previous message, such as the SKE SA Initialization Request message. At block 718, LKM 216 selects an encryption algorithm for encrypting data between the Initiator channel and the Responder channel based on a proposal list received in the SKE Authentication Request message and capabilities of the highest priority encryption algorithm that is supported by the responder node. When determined an encryption algorithm selection is possible at decision block 720, processing continues at block 724 following entry point G in FIG. 7B.

Referring to FIG. 7B, at block 724 LKM obtains the SA Index and the stored SPI Transform values. At block 726, LKM can transform the SPI using the stored SPI Transform values and the SA Index, with the transformed SPI to be placed in the SPI field of the SKE Authentication Response Message. At block 728, LKM 216 builds an SKE Authentication Response message, which includes the transformed SPI computed at block 726. Building of the SKE Authentication Response message can be based at least in part for example, on a successful state check, a successful validation, and selecting one of the encryption algorithms from the proposal list. The payload of the SKE Authentication Response message can include the responder signature as computed in block 716 and an indicator of the selected encryption algorithm based on the selection at block 718. For example, the payload of the SKE Authentication Response message can be encrypted using the same encryption algorithm as used for encrypting the payload of the SKE Authentication Request message. Further, for example, encrypting the SKE Authentication Response message can be independent of the proposal list.

At block 730, LKM builds a Done Message. The Done message can include one or more session keys, an initiator SPI, and a responder SPI to enable encrypted communication between the initiator channel and responder channel using the selected encryption algorithm. The session keys, also referred to as data transfer keys, can be computed based on the selected encryption algorithm and one or more of the set of cryptographic keys previously derived as seeding keys. The session keys can support encryption and decryption of data transfers between the initiator channel and responder channel in combination with knowledge of the selected encryption algorithm by both the initiator node and the responder node. The Done message may also set the SA state to complete and may trigger further cleanup actions associated with the authentication process. At block 732, LKM may start a session key rekey timer for the session key. The session key rekey timer can trigger a rekey process when the session key rekey timer expires as described below with respect to FIGS. 8A, 8B, and 8C. For example, the session key rekey timer can expire based on one or both of an amount of time expiring and a number of exchanges occurring between the target node and the source node. At block 734, LKM sends the SKE Authentication Response message and the Done message to the Responder channel, which sends the SKE Authentication Response and Done messages to the Initiator channel on the Initiator node. After processing the Done message, secure data transfers between HBAs 210 and HBAs 216 are performed using the selected encryption algorithm and session keys until session completion or rekeying.

Rekeying Keys of a Security Association Using an SPI Transform

Figure 8A:
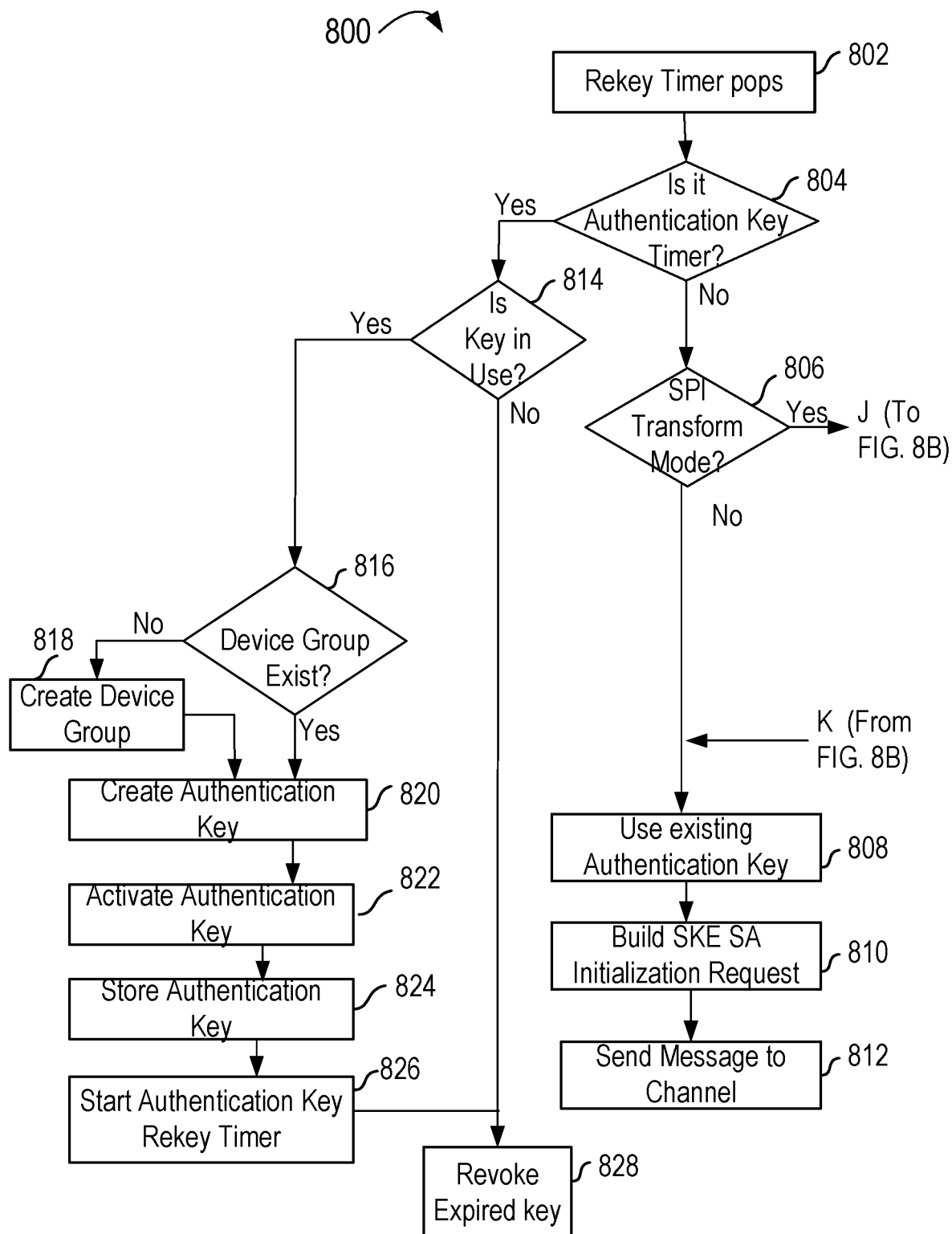
FIGS. 8A and 8B together provide a flow chart of example operations of a method for rekeying an Authentication key and a session key for a Security Association using an SPI transform of disclosed embodiments.
Figure 8B:
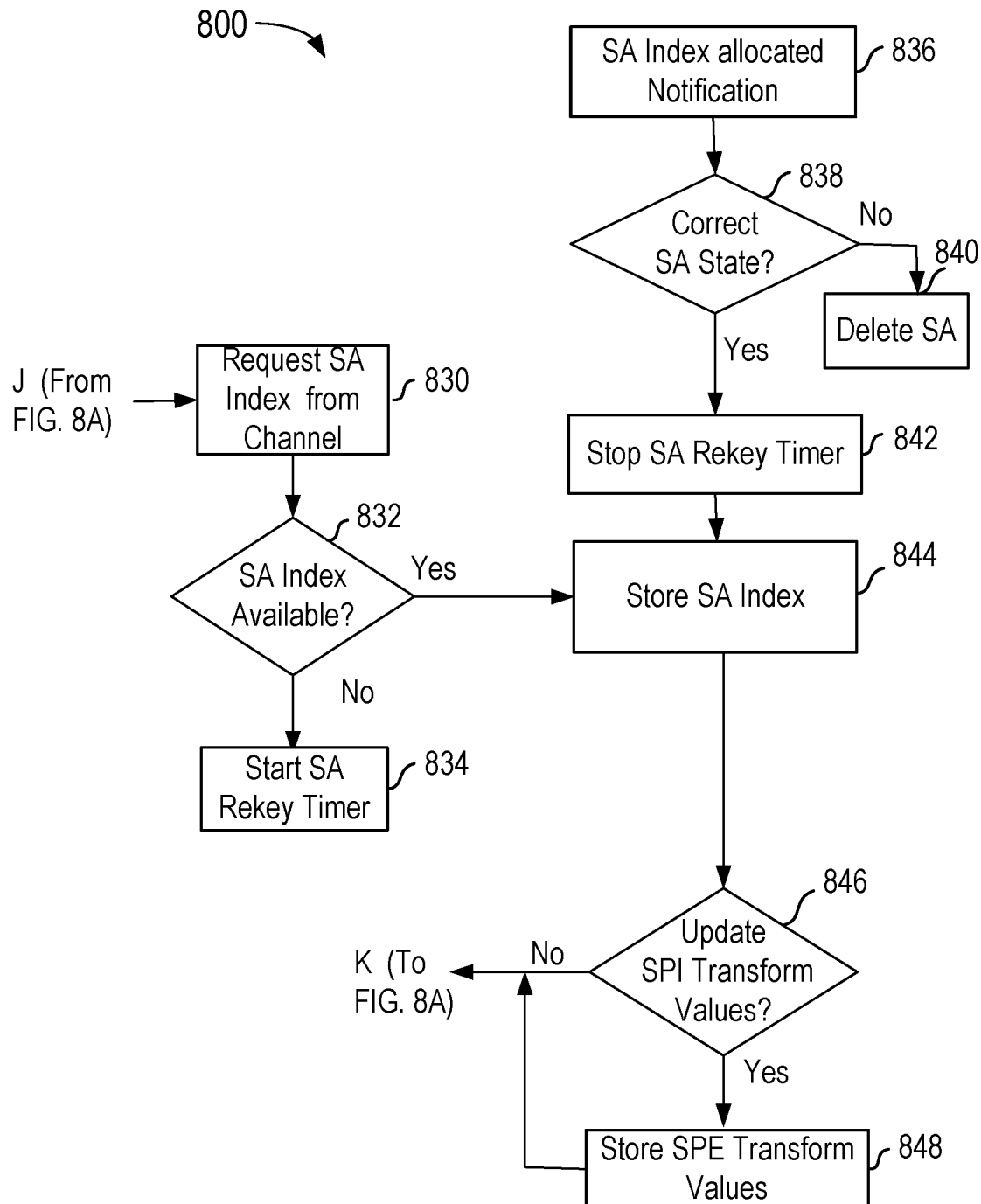

Processing continues to FIGS. 8A and 8B, after generating the Authentication Response message, as described in FIGS. 7A and 7B and processing secure data transfers using the Authentication key, selected encryption algorithm, and session keys. In accordance with disclosed embodiments, an authentication key (i.e., shared key) rekey timer and a session key rekey timer are set based on system policies. In accordance with disclosed embodiments, the rekey timers are initiated and monitored using the LKMs at each of the nodes. In accordance with disclosed embodiments, the LKM at each node in the computing environment controls (e.g., initiates and monitors) a separate session key rekey timer for each of the communication sessions that are in process between channels on a first node and channels on a second node in the computing environment. Each session key rekey timer is associated with a pair of channels (e.g., with each channel pair including a channel on the node where the LKM is executing). In accordance with disclosed embodiments, the authentication keys and session keys can be rekeyed or refreshed using the SPI transform of the SPI Transform Compatibility mode. FIGS. 8A and 8B together illustrate example operations of a method 800 (e.g., implemented by the LKM 202 and initiator channel 210 of system 200 of FIG. 2 and the Secure Key Exchange Control Code 182 and Security Parameter Index Transform Control Code 184 of FIG. 1) for rekeying an authentication key and a session key for a Security Association using the SPI transform of disclosed embodiments.

At block 802, a policy rekey timer expires triggering a rekey event by an LKM monitoring the rekey timer. For example, a rekey event can trigger rekeying of either an authentication key or a session key. Authentication keys, such as processed in method 400 of FIGS. 4A and 4B, are used across many SAs between two nodes, such as host server 201 and storage array 214. Session keys are maintained for a single SA for a communication session between two channels, with a session key rekey timer started as described for method 700 (e.g., at block 732 of FIG. 7B). At decision block 804, it is determined whether the rekey timer is an authentication key rekey timer or a session key rekey timer. At decision block 806, when determined a session key rekey timer has expired, LKM checks to determine if the channel specified the SPI Transform mode at initialization, (e.g., LKM checks the SA for the communication session between two channels).

When determined that the SPI Transform mode is selected for the SA of the session key rekey timer, processing continues at block 830 following entry point J in FIG. 8B, and when processing as shown in FIG. 8B completes, (e.g., after the LKM obtains a new SA Index and SPI Transform values) processing returns to block 808 following entry point K in FIG. 8A. Otherwise, when the SPI Transform mode is not selected for the SA of the identified expired session key rekey timer, processing continues at block 808.

At block 808, an existing authentication key is used, the SA state is updated, and the mode is set to Initiator rekeying. At block 808, the existing authentication key will be used for the entirety of the SKE message transaction for session key rekeying (e.g., regardless of any change the authentication key rekey timer).

When processing continued at block 808 following entry point K, after the LKM obtains the new SA Index and the existing or updated SPI Transform values; then at block 810, an SKE SA Initialization Request message is created (e.g., such as described relative to FIGS. 4A and 4B), with the SKE SA Initialization Request message constructed with a new generated nonce and a new computed SPI. At block 812, the SKE SA Initialization Request message is sent to the responder channel on the responder node, and the SA state is updated to Last message sent to an SKE SA Initialization Request, which initiates the SKE messaging process for rekeying of the session keys.

At decision block 814, when determined an authentication key timer has expired, LKM checks to determine if the authentication key is being used. When LKM determines there are no active SAs utilizing the authentication key, rekeying is not necessary, and the authentication key is revoked at block 828. When determined that the authentication key is being used, then at decision block 816, LKM checks to determine whether a device group exists between the pair of nodes associated with the authentication key rekey timer. If it is determined that a device group does not exist, then processing continues at block 818 with creating a device group between the initiator node and responder node pair, as described above with respect to method 400 of FIGS. 4A and 4B. When determined at block 816 that the device group exists between the initiator node and responder node pair, and after the device group is created at block 818, processing continues at block 820, to create a new authentication key. For example, to create the new authentication key, the LKM sends a request to create a new authentication key to the external key manager (EKM) 232, the key state is Pre-Active, and the EKM creates the new authentication key for the device group and associates the new authentication key with an authentication key identifier of the device group and the EKM sends the new authentication key and authentication key identifier to the requesting LKM.

At block 822, the LKM sends a request to activate the new authentication key to the EKM, and the key state transitions from Pre-Active to Active. At block 824, the LKM stores the updated key and authentication key identifier for the current authentication key, (e.g., LKM updates its local key store with the newly created authentication key and identifier, and removes the expired key). At block 826, LKM starts an authentication key rekey timer for the newly created authentication key. At block 828, LKM revokes the expired authentication key from the EKM, and the key state transitions from Active to Deactivated for the revoked authentication key.

Returning to FIG. 8B, processing continues at block 830 following entry point J when determined at decision block 806 in FIG. 8A that the channel specified the use of the SPI Transform mode at initialization. At block 830, the LKM sends a request to the channel to allocate an SA Index for a rekey operation, and the SA state is updated to REQUEST_SA_IDX. At decision block 832, LKM checks whether the channel responded with a valid SA Index. At block 834, when the channel was not able to allocate an SA Index at this time, LKM starts a Security Association rekey timer to retry the operation, and the SA state is updated to SA_RETRY.

At block 836, after the channel responds with a valid SA Index, the LKM receives a notification from the initiator channel that an SA Index has been allocated for the rekey operation. At decision block 838, LKM checks to determine if the SA is in the correct state (e.g., SA_RETRY state). At block 840, if the SA is not in the correct state, the LKM sends the channel a delete message for the SA, the stored values associated with the SA are removed from the key store, and the SA state is updated to SA_DELETED.

At block 842, when determined that the SA state is correct, the LKM halts the existing SA rekey timer (e.g., the SA rekey timer was started at block 834). At block 844, LKM stores the SA Index provided by the initiator channel, this stored SA Index value along with existing or updated SPI Transform values will be used to create the new SPI for building the new SKE SA Initialization Request message for the SKE messaging process for rekeying of the session keys. At decision block 846, LKM checks if the channel specified new transform values along with the new SA Index. At block 848, if the channel specified new SPI Transform values, LKM stores the updated SPI Transform values. Operations return to block 808 following entry point K in FIG. 8A to continue SKE message processing to rekey a session key using the SPI transform of disclosed embodiments, as described above with respect to the illustrated methods 400, 500, 600 and 700 of respective FIGS. 4A, 4B, 5A, 5B, 6A, 6B, 7A and 7B.

Generating the SKE Authentication Request Message Using an SPI Transform

Figure 10:
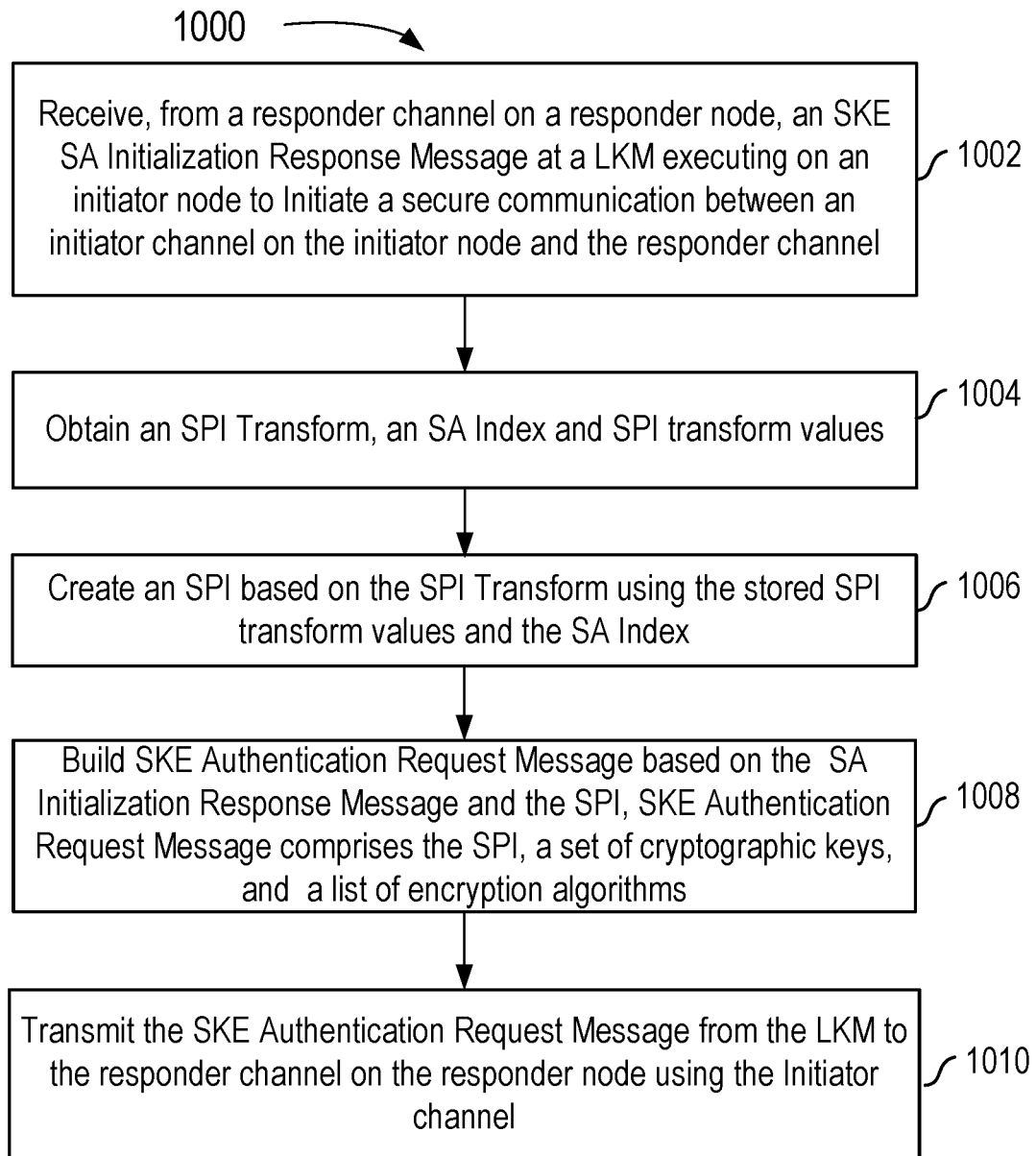
FIG. 10 is a flow chart of an example method for generating an SKE Authentication Request using an SPI Transform of one or more embodiments of the present disclosure.

FIG. 10 illustrates a method 1000 (e.g., implemented by system 200 of FIG. 2 and the Secure Key Exchange Control Code 182 and Security Parameter Index Transform Control Code 184 of FIG. 1) for generating the SKE Authentication Request message using an SPI Transform of one or more embodiments of the present disclosure. Method 1000 includes example operations and features as described with respect to method 600 of FIGS. 6A and 6B. At block 1002, an LKM executing on the Initiator node receives, from a responder channel on a responder node, an SKE SA Initialization Response message to initiate a secure communication between an initiator channel on the initiator node and the responder channel. For example, in a disclosed embodiment, the SKE SA Initialization Response message comprises an identifier of an Authentication key, a nonce, and SPI. In a disclosed embodiment, LKM can perform state and verification checks of the received SKE SA Initialization Response message based on the SA.

At block 1004, LKM obtains an SPI Transform, a Security Association (SA) Index and SPI Transform values. In a disclosed embodiment, the LKM performs a lookup of the previously saved SPI Transform, the SA Index, and the SPI Transform values to create an SPI for the responder that are used to build the SKE Authentication Request message. At block 1006, LKM creates an SPI based on the SPI Transform using the SPI Transform values and the SA Index. In a disclosed embodiment, LKM computes two or more transformations, each transformation comprising a combination of two or more of a SPI mask, a SPI shift, a generated random number, a transformation result, or a SPI base, and the SA Index. For example, LKM computes the SPI using multiple transformations such as illustrated and described, in method 400 with respect to FIGS. 4A, and 4B, and in SPI Transform methods 916, 920, 930, and 940 of FIGS. 9A, 9B, 9C, and 9D.

At block 1008, LKM builds the SKE Authentication Request message based on the SKE SA Initialization Response message and the SPI, where the SKE Authentication Request message comprises the SPI, a set of cryptographic keys, and a list of encryption algorithms. At block 1010, LKM transmits the SKE Authentication Request message from the LKM to the responder channel on the responder node using the initiator channel.

Generating the SKE Authentication Response Message Using an SPI Transform

Figure 11:
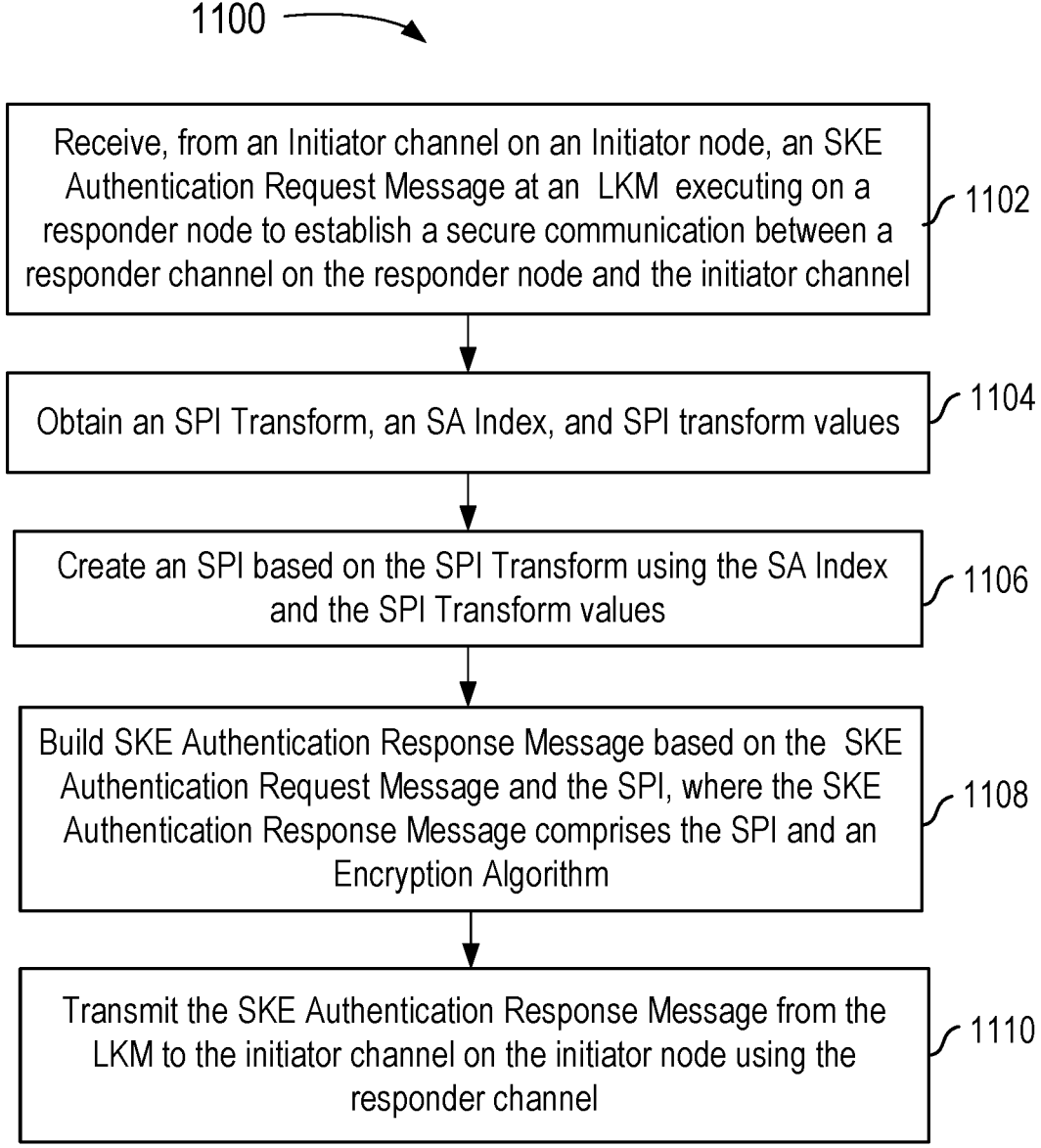
FIG. 11 is a flow chart of an example method for generating an SKE Authentication Response using an SPI Transform of one or more embodiments of the present disclosure.

FIG. 11 illustrates a method 1100 (e.g., implemented by system 200 of FIG. 2 and the Secure Key Exchange Control Code 182 and Security Parameter Index Transform Control Code 184 of FIG. 1) for generating the SKE Authentication Response message using an SPI Transform of disclosed embodiments. Method 1100 includes example operations and features as described with respect to method 700 of FIGS. 7A and 7B.

At block 1102, an LKM executing on a responder node receives an SKE Authentication Request message, from an initiator channel on an initiator node, to initiate a secure communication between a responder channel on the responder node and the initiator channel. In one disclosed embodiment, the LKM receives the SKE Authentication Request message with an SKE SA Index message as a trailer providing the SA Index from the responder channel. In a disclosed embodiment, the LKM performs validations checks of the received SKE Authentication Request message.

At block 1104, the LKM obtains a selected SPI Transform, an SA Index and SPI Transform values. At block 1106, the LKM creates an SPI based on the SPI Transform using the SPI Transform values and the SA Index. For example, in a disclosed embodiment, the LKM selects an encryption algorithm for encrypting data between the Initiator channel and the Responder channel; for example, based on a proposal list of encryption algorithms received in the SKE Authentication Request message and capabilities of the highest priority encryption algorithm that is supported by the responder node. At block 1108 the LKM builds the SKE Authentication Response message based on the SKE Authentication Request message and the SPI; where the SKE Authentication Response message comprises the SPI and an encryption algorithm. At block 1110, the LKM transmits the SKE Authentication Response message from the LKM to the initiator channel on the initiator node using the responder channel.

Disclosed Rekeying Keys of a Security Association Using an SPI Transform

Figure 12:
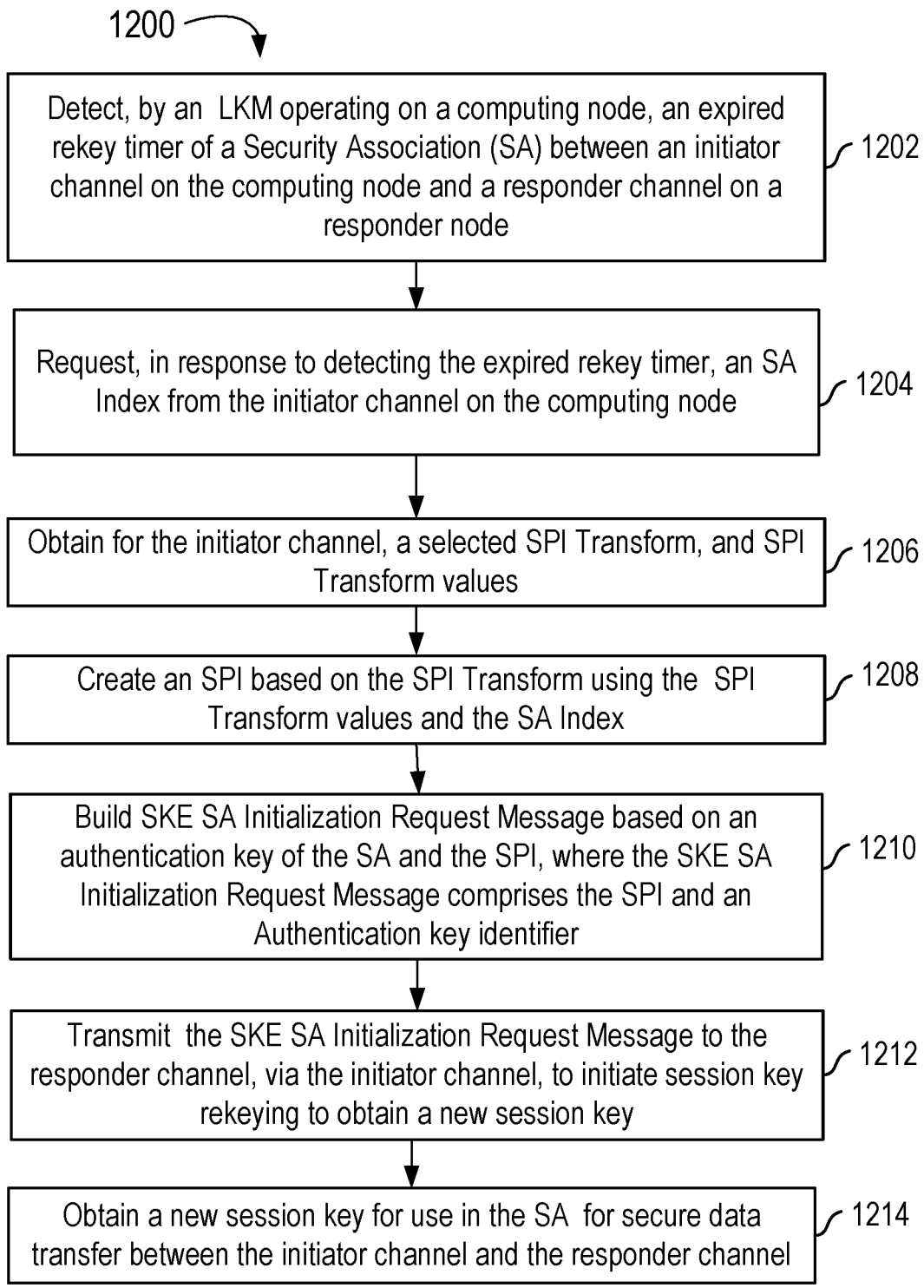
FIG. 12 is a flow chart of an example method for rekeying keys of a Security Association (SA) using an SPI transform of one or more embodiments of the present disclosure

FIG. 12 illustrates an example method 1200 (e.g., implemented by system 200 of FIG. 2 and the Secure Key Exchange Control Code 182 and Security Parameter Index Transform Control Code 184 of FIG. 1) for rekeying keys of a Security Association (SA) using an SPI transform of one or more disclosed embodiments. Method 1200 includes example operations and features as described with respect to method 800 of FIGS. 8A and 8B.

At block 1202, an LKM executing on a computing node detects an expired rekey timer of a Security Association (SA) between an initiator channel on the computing node and a responder channel on a responder node. For example, in a disclosed embodiment, the LKM monitors a plurality of rekey timers on the computing node comprising at least one authentication key rekey timer and at least one session key rekey timer.

For example, an authentication key rekey timer is maintained (e.g., initiated and controlled) by the LKM for an authentication key used across many Security Associations (SAs), which is obtained from an EKM to enable secure communication between two nodes in a computing system or computing environment. For example, the LKM maintains a session key rekey timer for a session key used for a current communication session for a single SA between channels of the computing node where the LKM is operating and another channel on another node. The session key rekey timer are used to limit an amount of time, or a number of transfers, that the session key remains valid for the current communication session between two channels. In a disclosed embodiment, the LKM at each node in the computing system controls a separate session key rekey timer for each associated pair of channels of an SA of the communication sessions.

At block 1204, the LKM requests, in response to detecting the expired rekey timer, an SA Index from the initiator channel on the computing node. At block 1206, LKM obtains for the initiator channel, a selected SPI Transform, and SPI Transform values. At block 1208, LKM creates an SPI based on the SPI Transform using the SPI Transform values and the SA Index. At block 1210, LKM builds an SKE SA Initialization Request message based on an authentication key of the SA and the SPI, where the SKE SA Initialization Request message comprises the SPI and an authentication key identifier. At block 1212, the LKM transmits the SKE SA Initialization Request message to the responder channel, via the initiator channel to initiate session key rekeying to obtain a new session key. At block 1214, LKM obtains a new session key for use in the SA for secure data transfer between the initiator channel and the responder channel.

While the foregoing is directed to embodiments of the present invention, other and further embodiments of the invention may be devised without departing from the basic scope thereof, and the scope thereof is determined by the claims that follow.

What is claimed is:

1. A method comprising:
    receiving, from an initiator channel on an initiator node, a Secure Key Exchange (SKE) Authentication Request message at a local key manager (LKM) executing on a responder node to initiate a secure communication between a responder channel on the responder node and the initiator channel;
    obtaining a selected Security Parameter Index (SPI) Transform, a Security Association (SA) Index, and SPI Transform values from the SKE Authentication Request message;
    creating a SPI based on the SPI Transform using the SA Index and the SPI Transform values;
    building a SKE Authentication Response message based on the SKE Authentication Request message and the SPI; wherein the SKE Authentication Response message comprises the SPI and an encryption algorithm;
    transmitting the SKE Authentication Response message from the LKM to the initiator channel on the initiator node using the responder channel; and
    performing a secure data transfer between the responder channel on the responder node and the initiator channel on the initiator node based on the SKE Authentication Response message.

2. The method of claim 1, wherein obtaining the SPI Transform, the SA Index and the SPI Transform values further comprises registering the responder channel with the LKM executing on the responder node, and wherein the responder channel selects the SPI Transform and provides the SPI Transform values, and wherein the LKM registers the SPI Transform and the SPI Transform values.

3. The method of claim 2, further comprises using a random number generator to generate the SPI Transform values, at the responder channel on the responder node, wherein the SPI Transform values comprise a random SPI base, a random SPI shift, and a SPI mask.

4. The method of claim 1, wherein obtaining the SPI Transform, the SA Index and the SPI Transform values further comprises allocating the SA Index and combining a SA Index message with a SKE SA Initialization Request message at the responder channel to provide the SA Index to the LKM.

5. The method of claim 1, further comprises selecting the encryption algorithm based on a list of encryption algorithms from the SKE Authentication Request message.

6. The method of claim 1, wherein creating the SPI based on the SPI Transform using the SA Index and the SPI Transform values further comprises computing two or more transformations; wherein each transformation comprising a combination of two or more of a SPI mask, a SPI shift, a generated random number, a transformation result, or a SPI base, and the SA Index.

7. The method of claim 1, further comprising decrypting a message payload of the SKE Authentication Request message, and performing validation checks based on the SKE Authentication Request message.

8. The method of claim 1, further comprises building a Done message, the Done message comprising one or more session keys, an initiator SPI, and a responder SPI to enable encrypted communication between the initiator channel and responder channel using the encryption algorithm; starting a session key rekey timer for each of the one or more session keys; and transmitting the SKE Authentication Response message and the Done message to the initiator channel on the initiator node using the responder channel.

9. The method of claim 1, wherein building the SKE Authentication Response message further comprises building one or more session keys based on the encryption algorithm and one or more of a set of cryptographic keys to support encryption and decryption of secure data transfers between the initiator channel and responder channel.

10. The method of claim 1, further comprises the LKM executing on the responder node receiving a SKE SA Initialization Request message with a SA Index trailer message providing the SA Index, the LKM storing the SA Index; creating a Security Association (SA) between the responder node and the initiator node based on the SKE Initialization Request message; and wherein creating the SPI, building a SKE SA Initialization Response message; and transmitting the SKE SA Initialization Response message are performed in response to receiving the SKE SA Initialization Request message.

11. A system, comprising:
a processor; and
a memory, wherein the memory includes a computer program product configured to perform operations for generating a secure key exchange (SKE) Authentication Response message, using a Security Parameter Index (SPI) Transform, the operations comprising:
receiving, from an initiator channel on an initiator node, a SKE Authentication Request message at a local key manager (LKM) executing on a responder node to initiate a secure communication between a responder channel on the responder node and the initiator channel;
obtaining a selected Security Parameter Index (SPI) Transform, a Security Association (SA) Index, and SPI Transform values from the SKE Authentication Request message;
creating a SPI based on the SPI Transform using the SA Index and the SPI Transform values;
building a SKE Authentication Response message based on the SKE Authentication Request message and the SPI; wherein the SKE Authentication Response message comprises the SPI and an encryption algorithm;
transmitting the SKE Authentication Response message from the LKM to the initiator channel on the initiator node using the responder channel; and
performing a secure data transfer between the responder channel on the responder node and the initiator channel on the initiator node based on the SKE Authentication Response message.

12. The system of claim 11, wherein obtaining the Security Parameter Index (SPI) Transform values further comprises registering the responder channel with the LKM executing on the responder node, wherein the responder channel selects the SPI Transform and provides selected SPI Transform values, and wherein the LKM registers the selected SPI Transform and the SPI Transform values.

13. The system of claim 11, further comprises the LKM executing on the responder node receiving a SKE SA Initialization Request message with a SA Index trailer message providing the SA Index, the LKM storing the SA Index; creating a Security Association (SA) between the responder node and the initiator node based on the SKE Initialization Request message; and wherein creating the SPI, building a SKE SA Initialization Response message; and transmitting the SKE SA Initialization Response message are performed in response to receiving the SKE SA Initialization Request message.

14. The system of claim 11, wherein building the SKE Authentication Response message further comprises building one or more session keys based on the encryption algorithm and one or more of a set of cryptographic keys to support encryption and decryption of secure data transfers between the initiator channel and responder channel.

15. The system of claim 11, wherein obtaining the SPI Transform values and the SA Index further comprises allocating the SA Index and combining a SA Index message including the SA Index with the SKE Authentication Request message at the responder channel to provide the SA Index to the LKM.

16. A computer program product for generating a secure key exchange (SKE) Authentication Response using a Security Parameter Index (SPI) Transform, the computer program product comprising:

a computer-readable storage medium having computer-readable program code embodied therewith, the computer-readable program code executable by one or more computer processors to perform an operation comprising:
receiving, from an initiator channel on an initiator node, a Secure Key Exchange (SKE) Authentication Request message at a local key manager (LKM) executing on a responder node to initiate a secure communication between a responder channel on the responder node and the initiator channel;
obtaining a selected Security Parameter Index (SPI) Transform, a Security Association (SA) Index, and SPI Transform values from the SKE Authentication Request message;
creating a SPI based on the SPI Transform using the SA Index and the SPI Transform values;
building a SKE Authentication Response message based on the SKE Authentication Request message and the SPI; wherein the SKE Authentication Response message comprises the SPI and an encryption algorithm;
transmitting the SKE Authentication Response message from the LKM to the initiator channel on the initiator node using the responder channel; and
performing a secure data transfer between the responder channel on the responder node and the initiator channel on the initiator node based on the SKE Authentication Response message.

17. The computer program product of claim 16, wherein obtaining the SPI Transform values further comprises registering the responder channel with the LKM executing on the responder node, wherein the responder channel selects the SPI Transform and provides the selected SPI Transform values, and wherein the LKM registers the selected SPI Transform and the SPI Transform values.

18. The computer program product of claim 16, further comprises the LKM executing on the responder node receiving the SKE SA Initialization Request message with a SA Index trailer message providing a SA Index, the LKM storing the SA Index; creating a Security Association (SA) between the responder node and the initiator node based on the SKE Initialization Request message; and wherein creating the SPI, building a SKE SA Initialization Response message; and transmitting the SKE SA Initialization Response message are performed in response to receiving the SKE SA Initialization Request message.

19. The computer program product of claim 16, wherein building the SKE Authentication Response message further comprises building one or more session keys based on the encryption algorithm and one or more of a set of cryptographic keys to support encryption and decryption of secure data transfers between the initiator channel and responder channel.

20. The computer program product of claim 16, wherein obtaining the SPI Transform values and the SA Index further comprises allocating the SA Index and combining a SA Index message that includes the SA Index with the SKE Authentication Request message at the responder channel to provide the SA Index to the LKM.

\* \* \* \* \*